Nov. 15, 1932.  D. Y. READ  1,888,144
VISIBLE WRITING CALCULATING MACHINE
Filed April 27, 1926    18 Sheets-Sheet 2
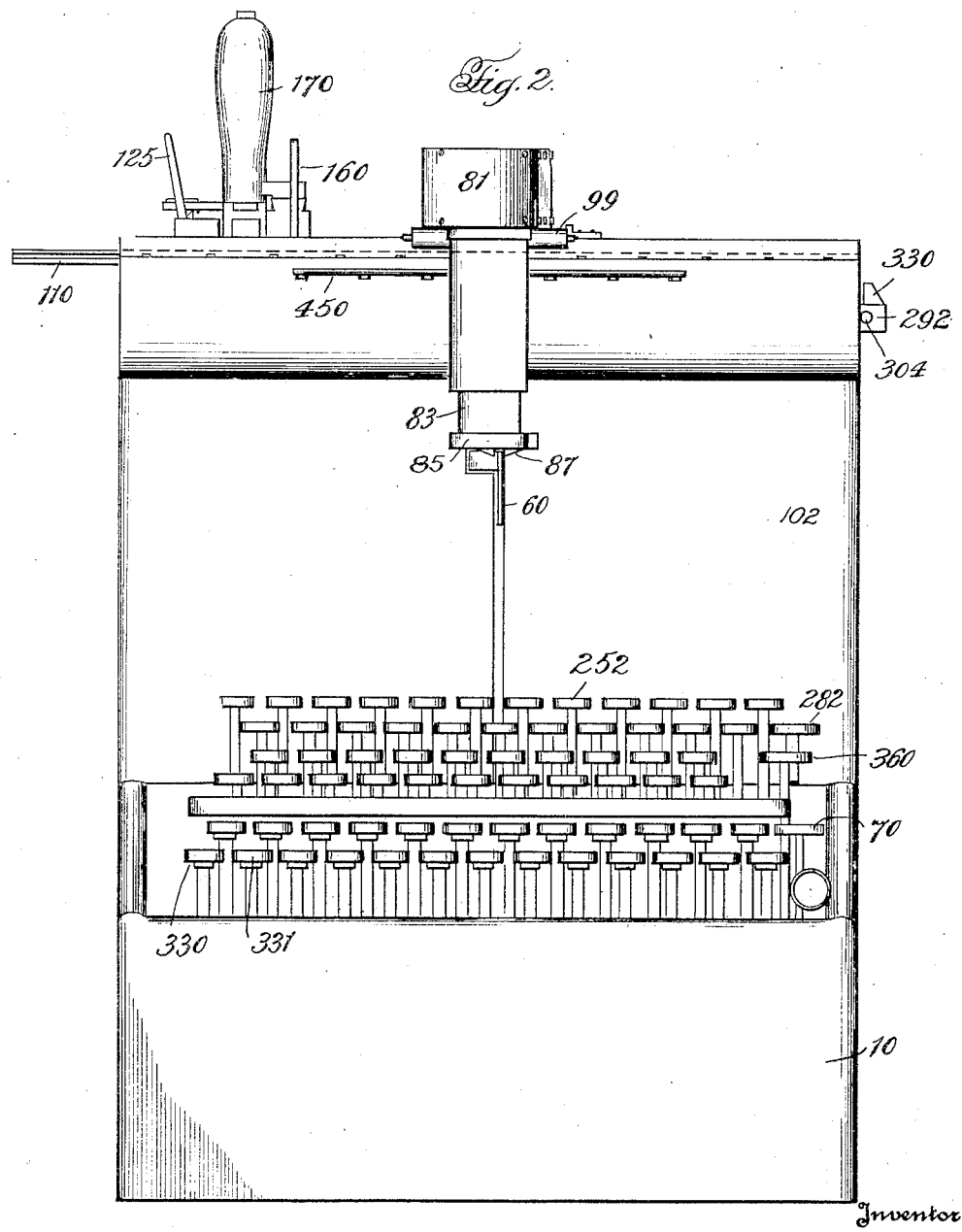
Inventor
David Y. Read,
By H. H. Snelling
Attorney

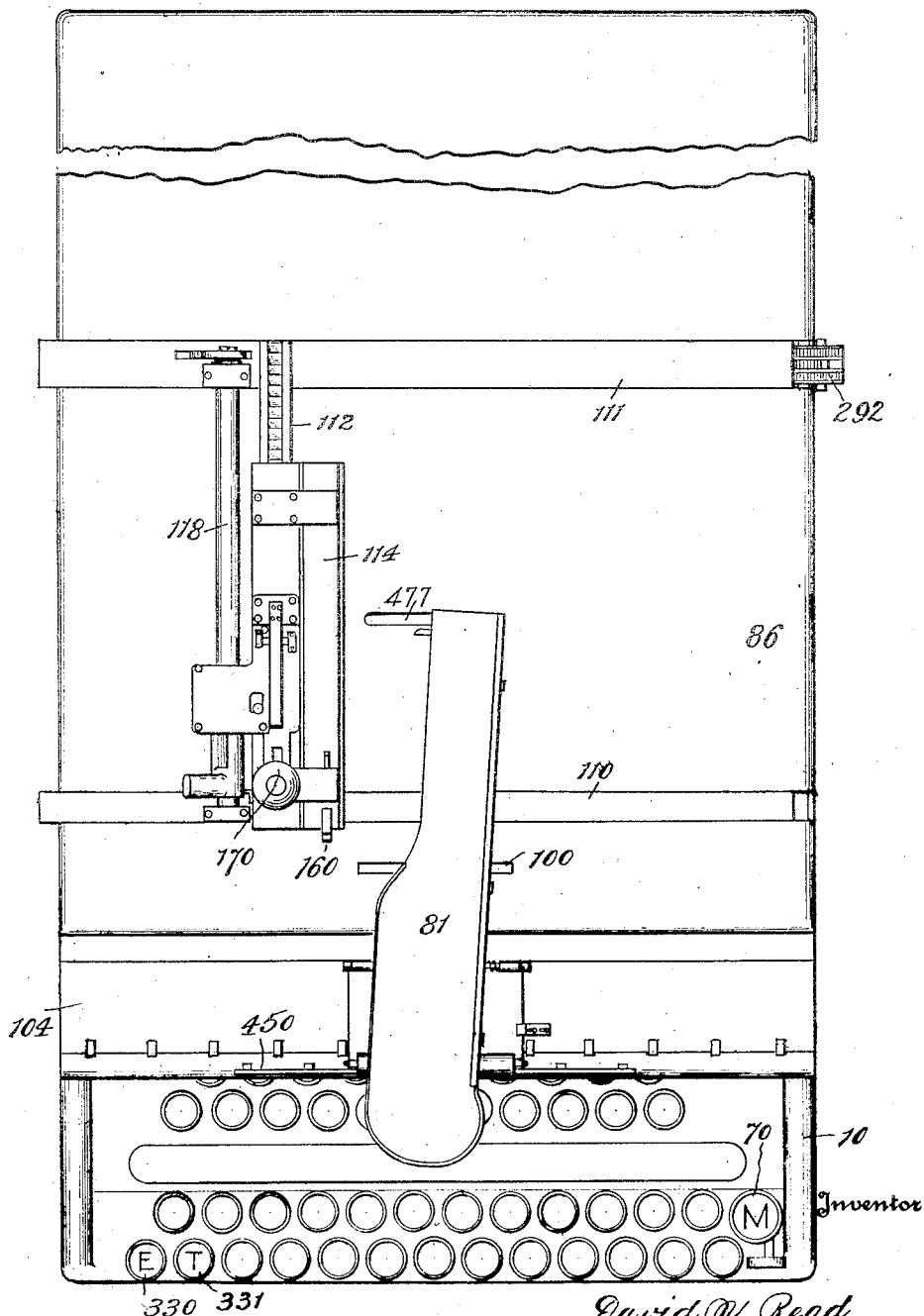

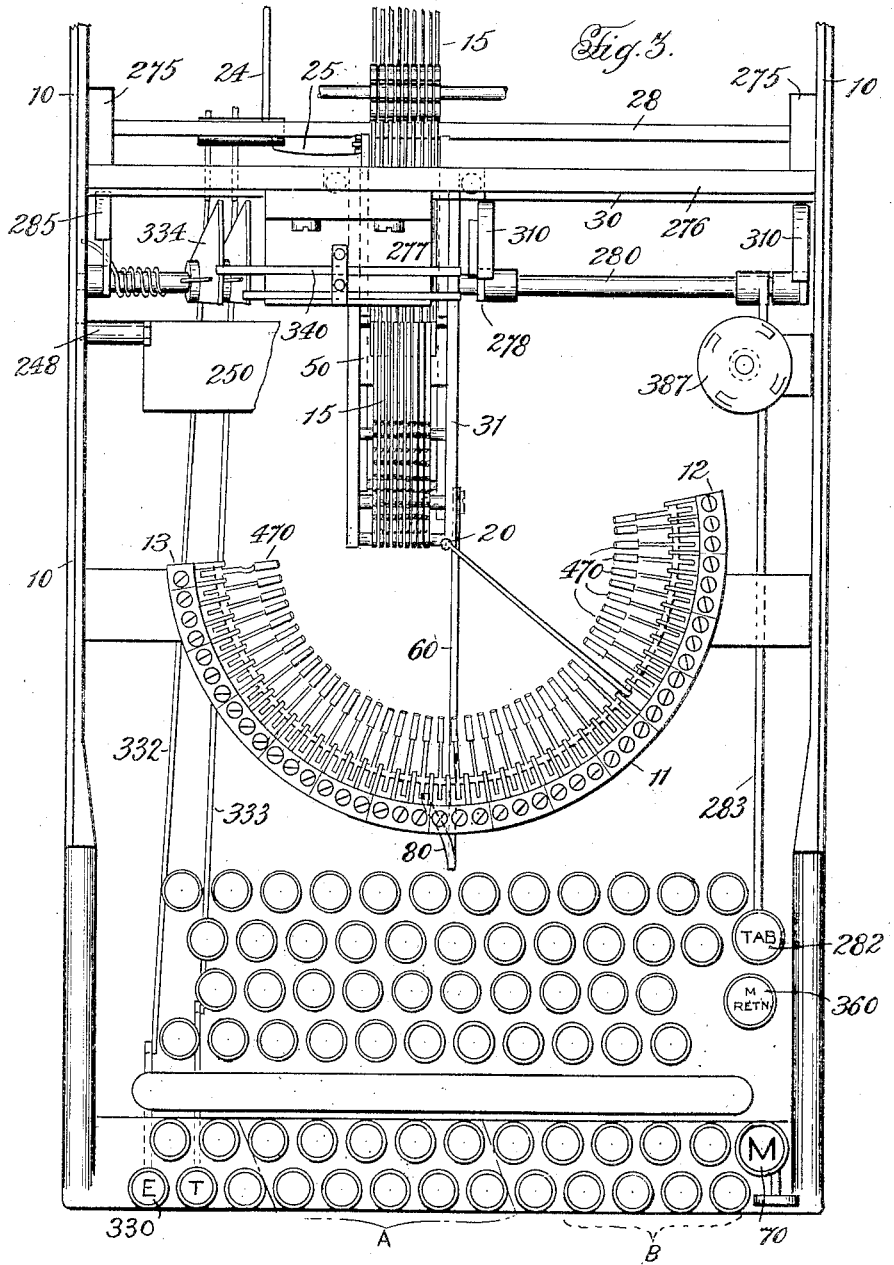

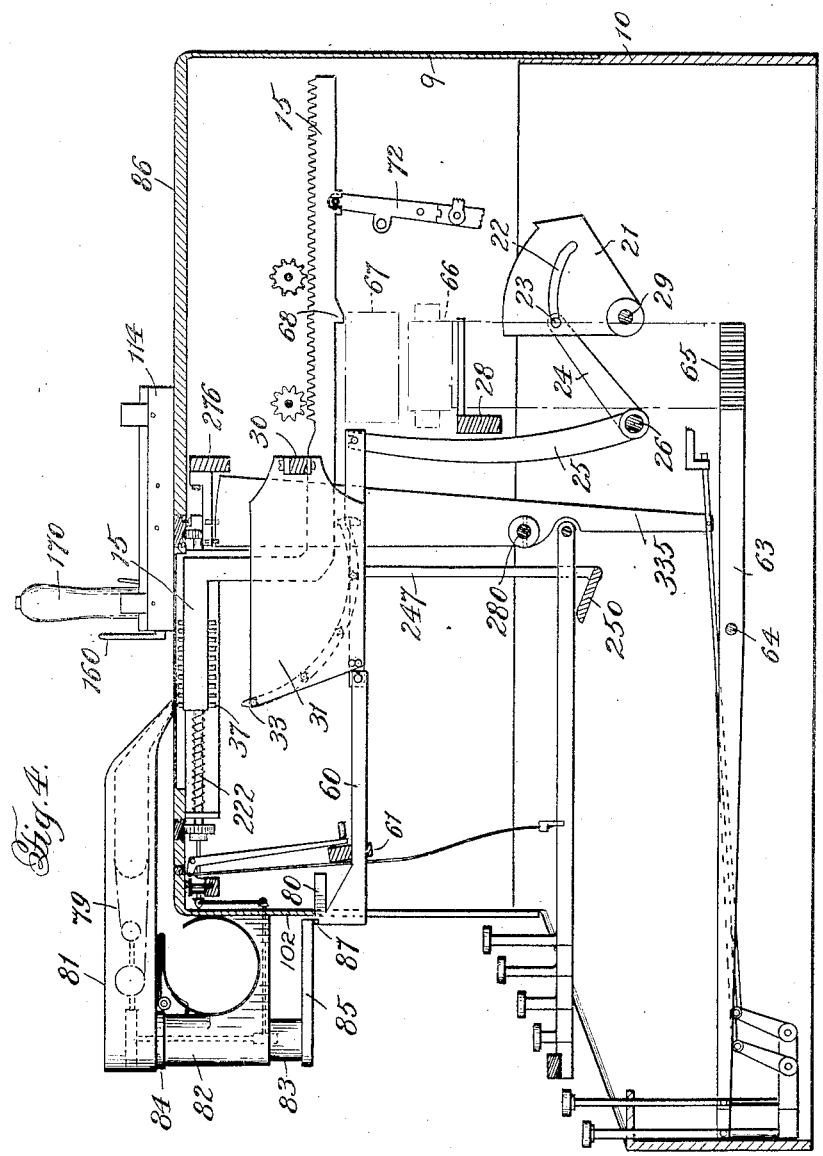

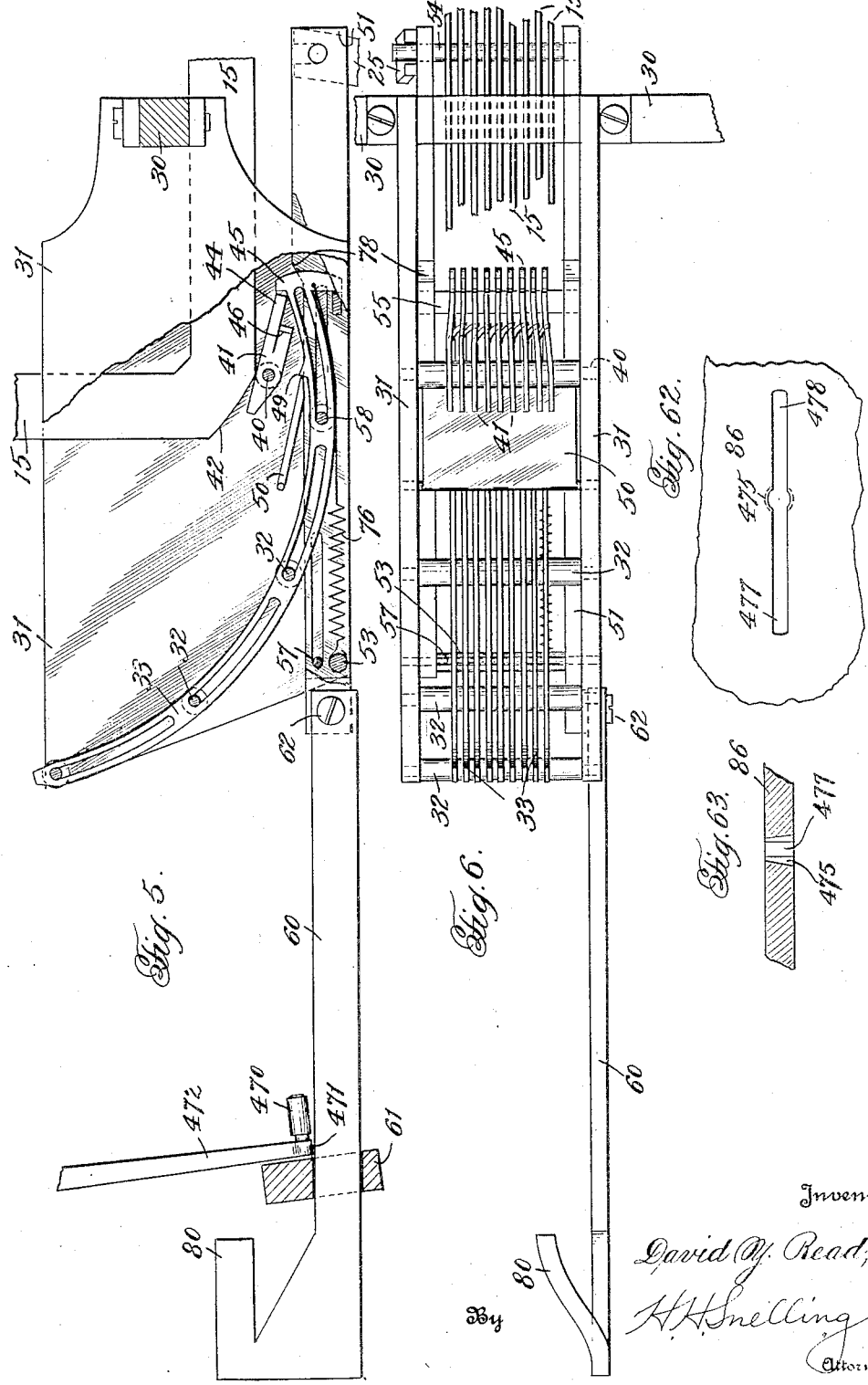

Nov. 15, 1932.   D. Y. READ   1,888,144
VISIBLE WRITING CALCULATING MACHINE
Filed April 27, 1926   18 Sheets-Sheet 6
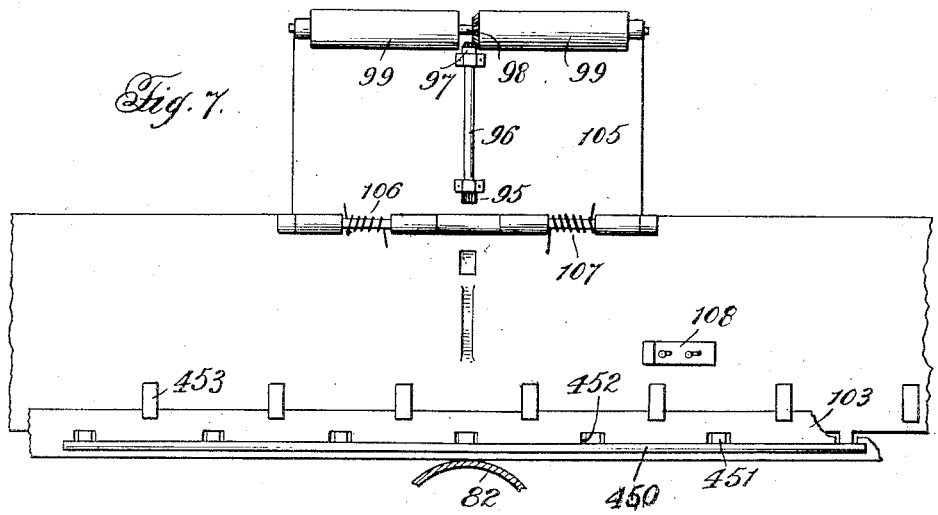
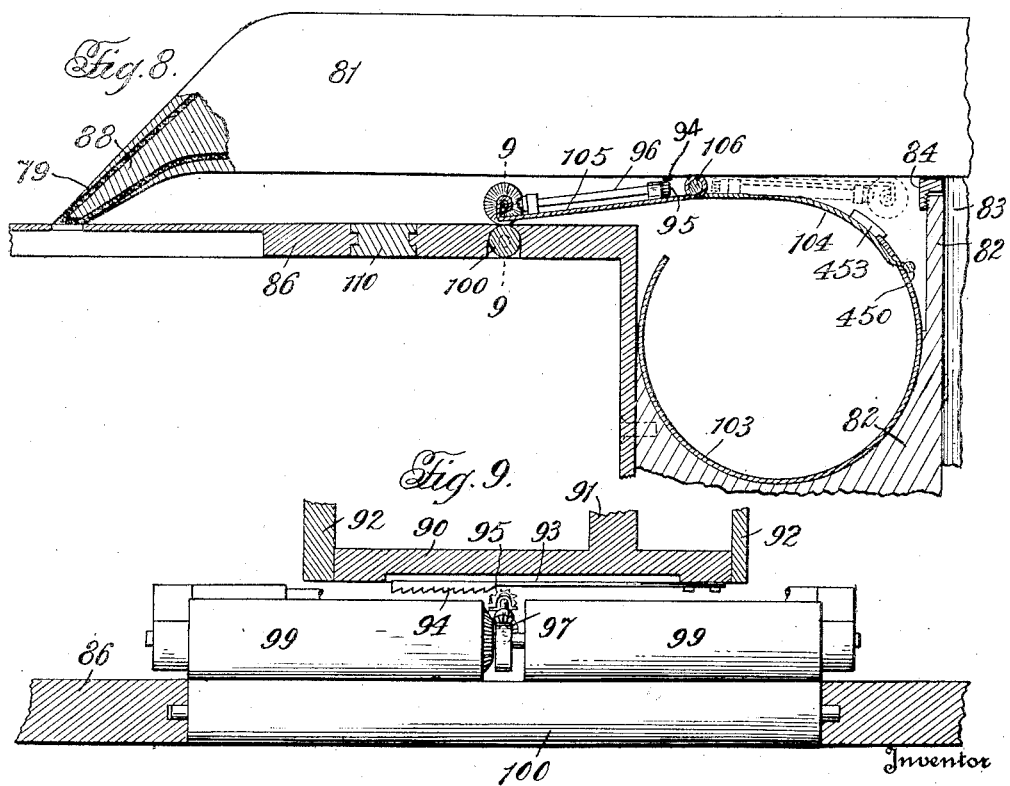

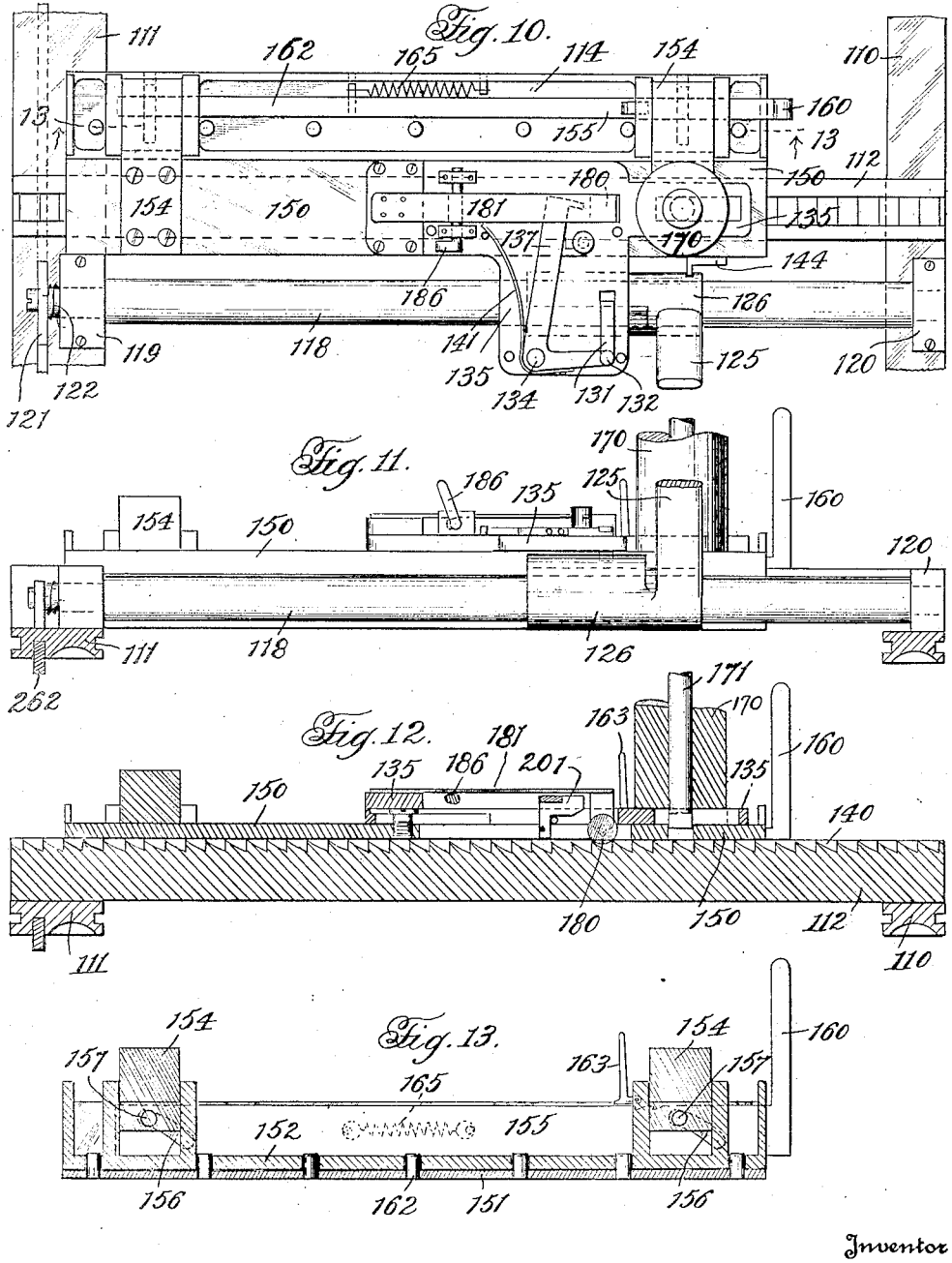

Nov. 15, 1932.  D. Y. READ  1,888,144
VISIBLE WRITING CALCULATING MACHINE
Filed April 27, 1926   18 Sheets-Sheet 8
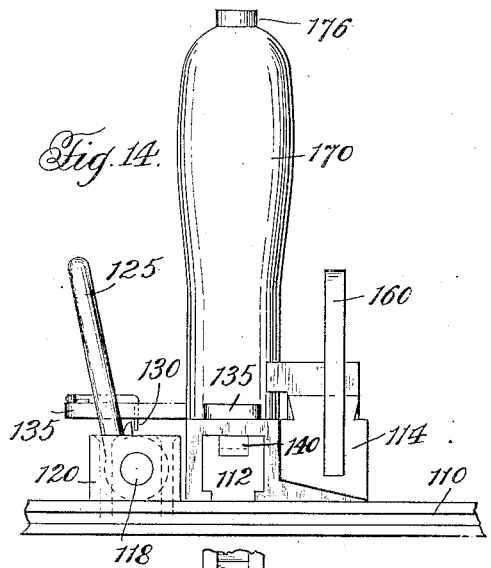
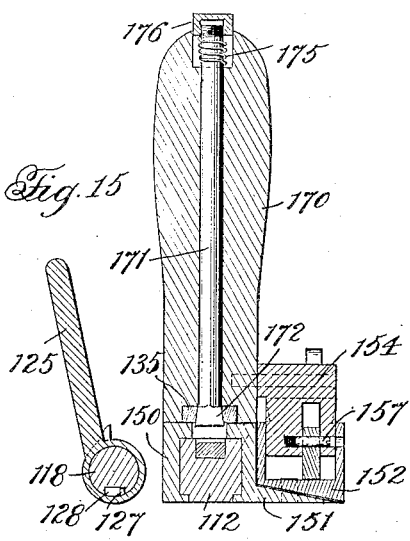
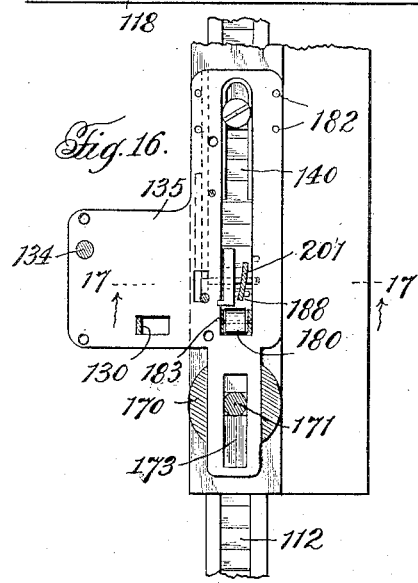
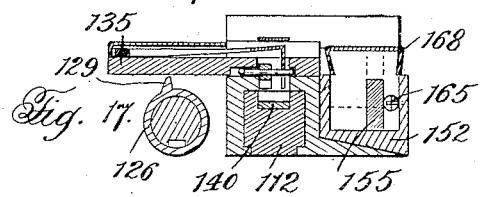
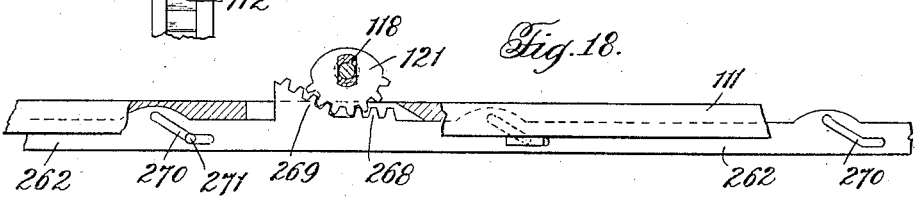
Inventor
David Y. Read,
By H. H. Snelling
Attorney

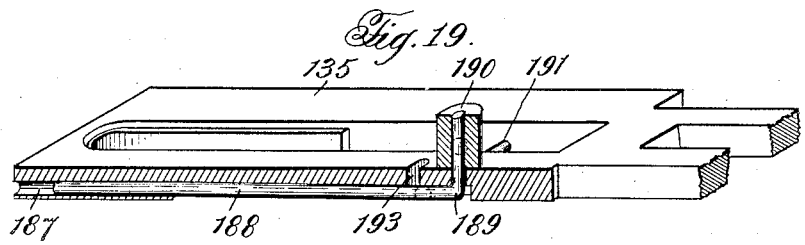
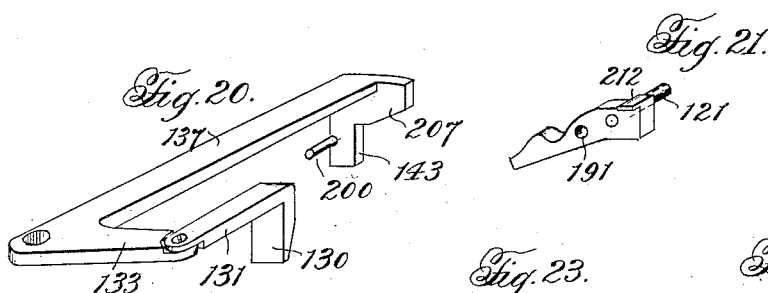
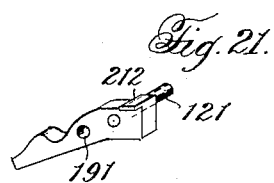
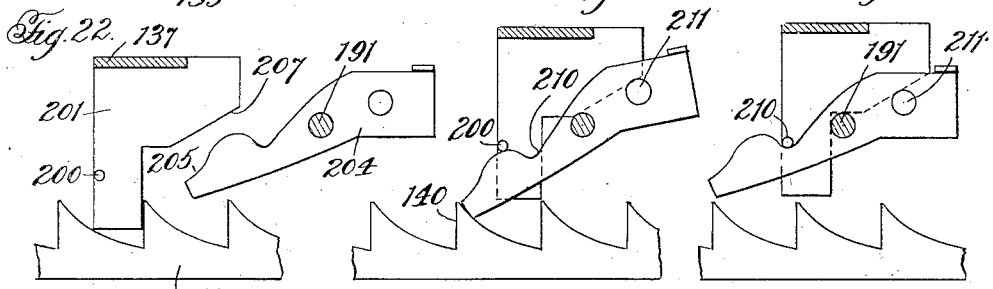
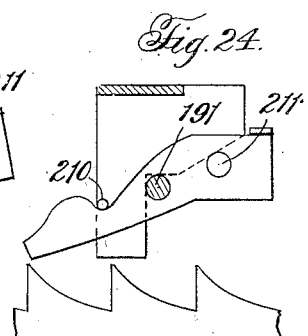

Nov. 15, 1932.                 D. Y. READ                 1,888,144
                    VISIBLE WRITING CALCULATING MACHINE
                  Filed April 27, 1926        18 Sheets-Sheet 10
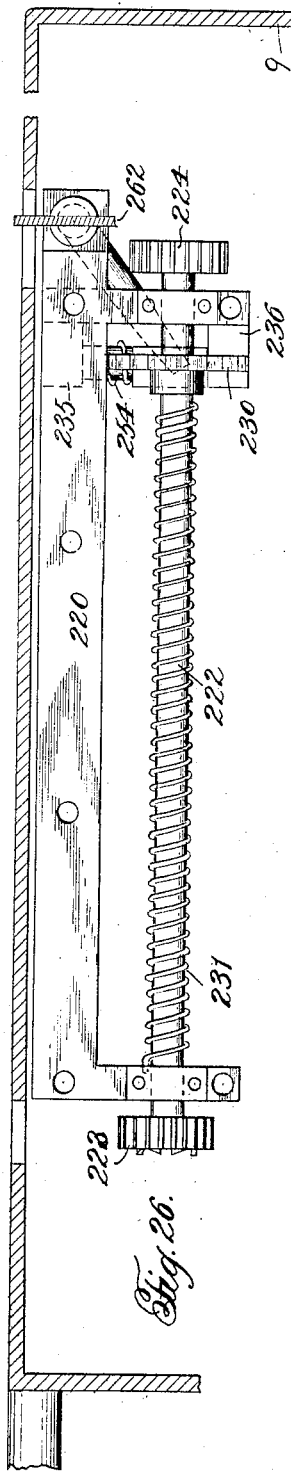
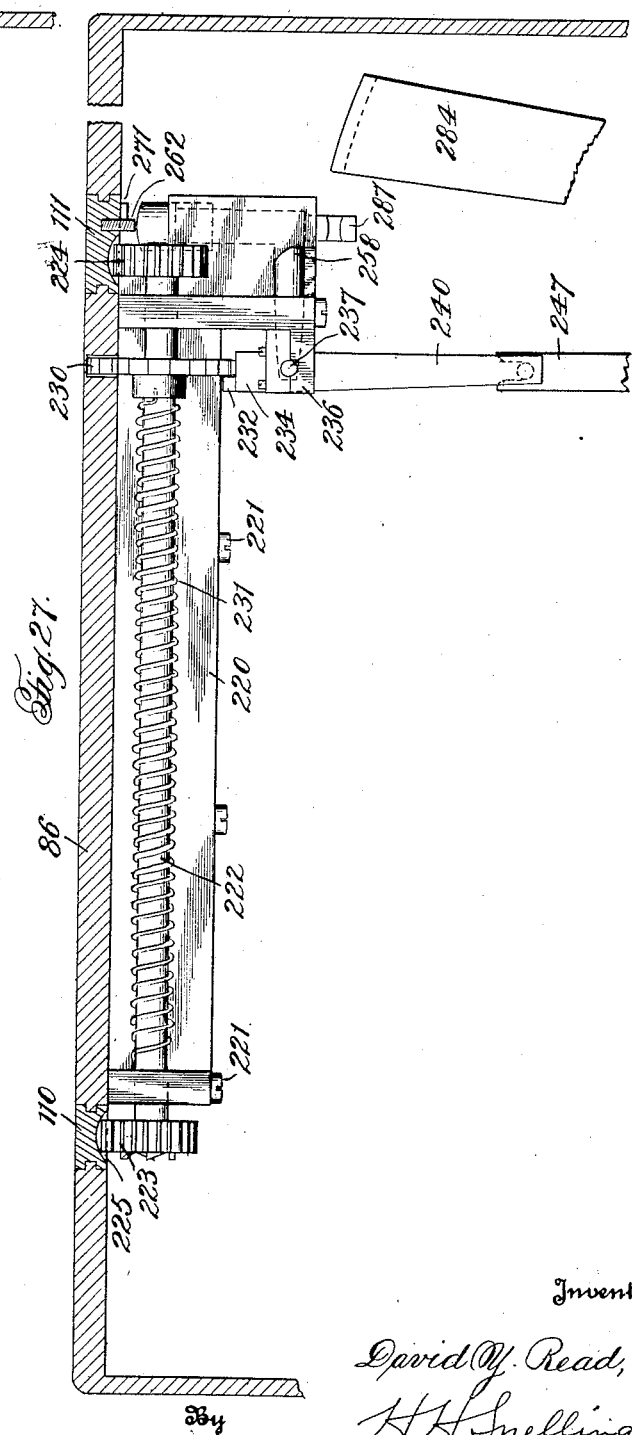
Inventor
David Y. Read,
H. H. Snelling
By
Attorney Nov. 15, 1932.        D. Y. READ         1,888,144
VISIBLE WRITING CALCULATING MACHINE
Filed April 27, 1926    18 Sheets-Sheet 11
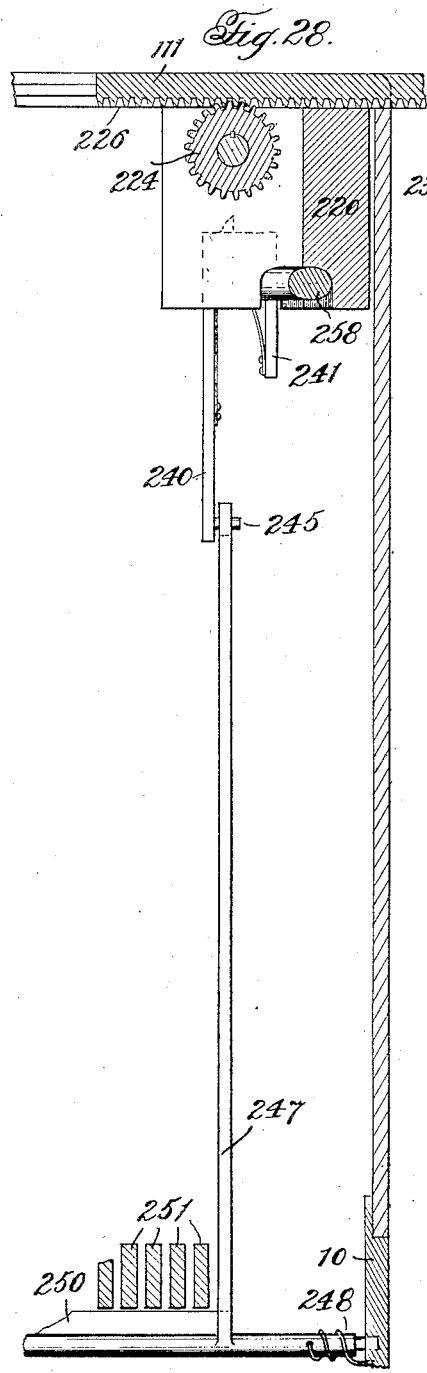
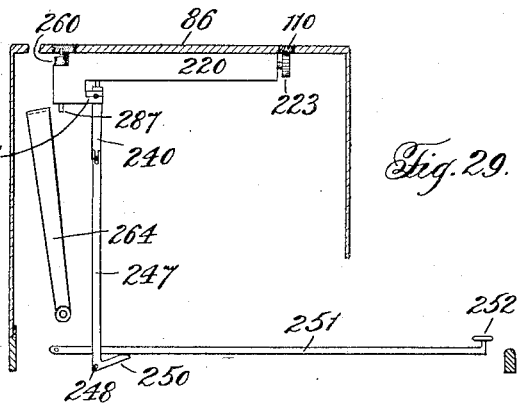
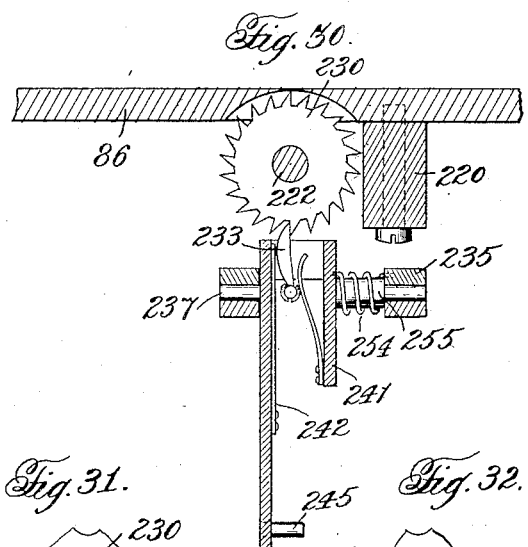
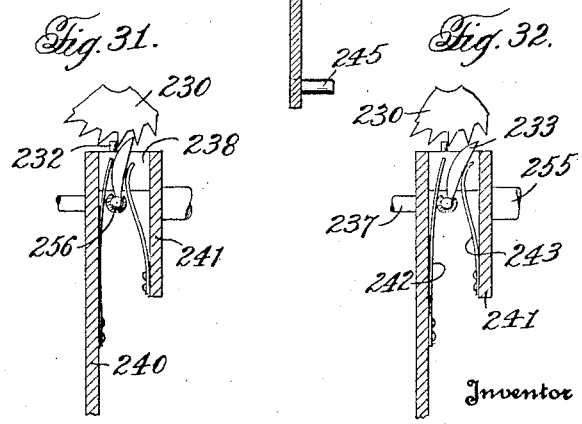

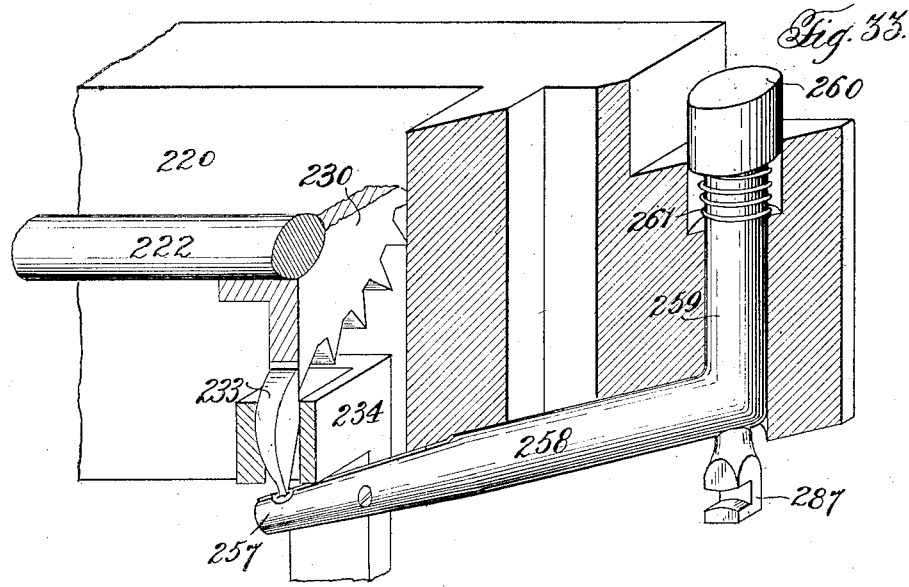
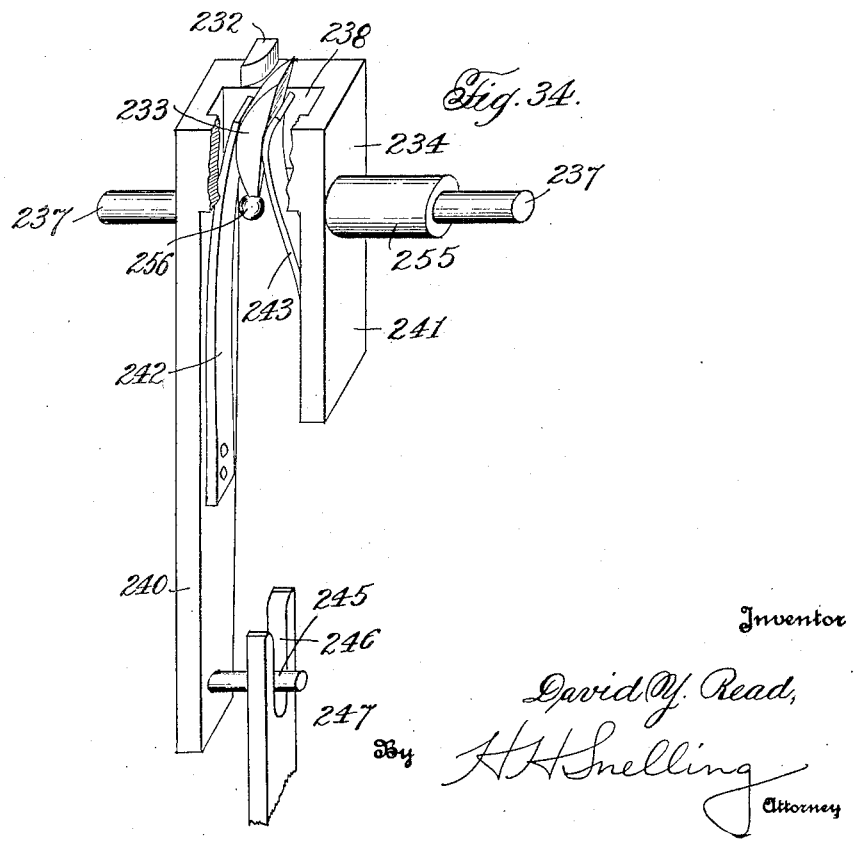

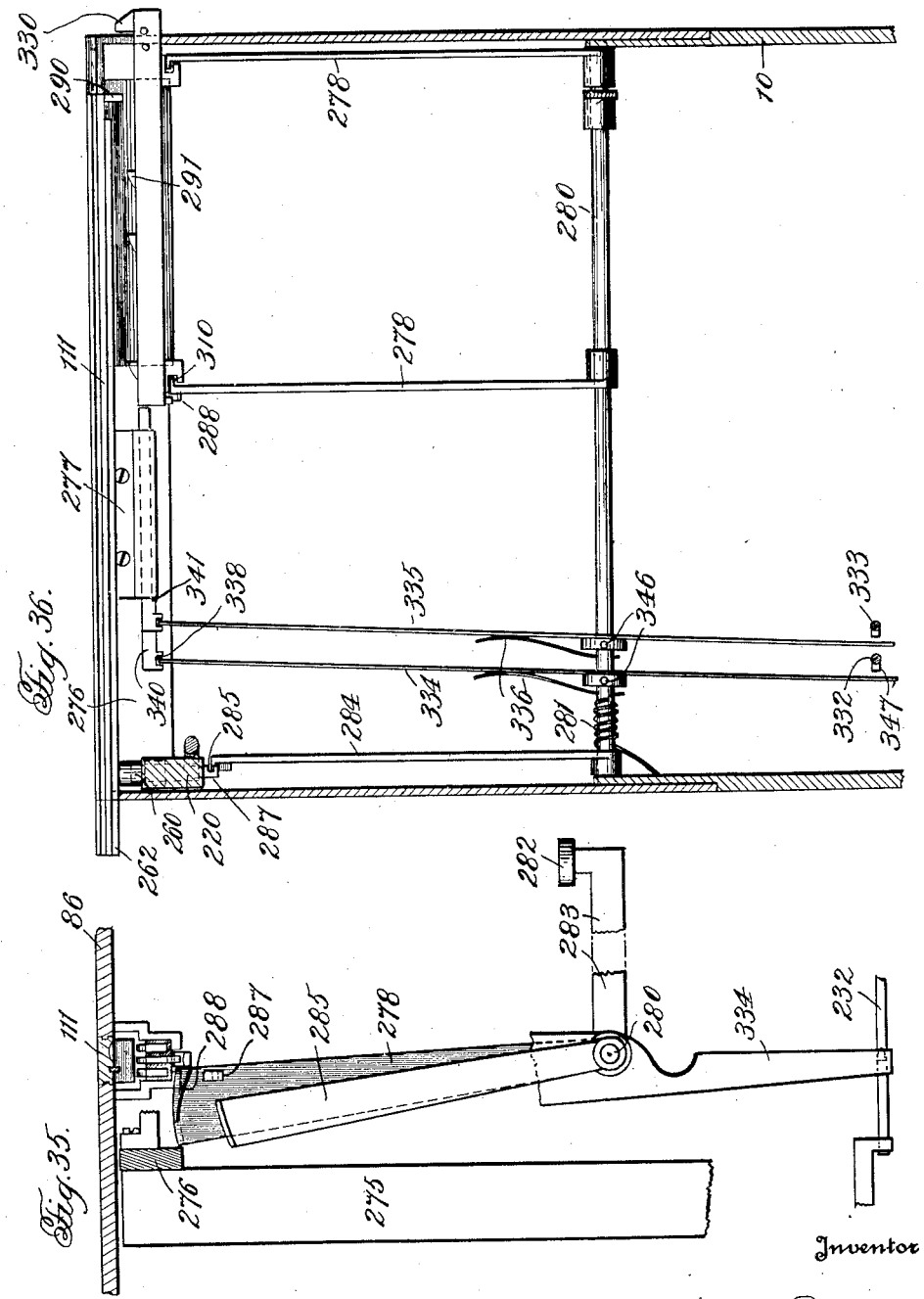

Nov. 15, 1932.  D. Y. READ  1,888,144
VISIBLE WRITING CALCULATING MACHINE
Filed April 27, 1926  18 Sheets-Sheet 14
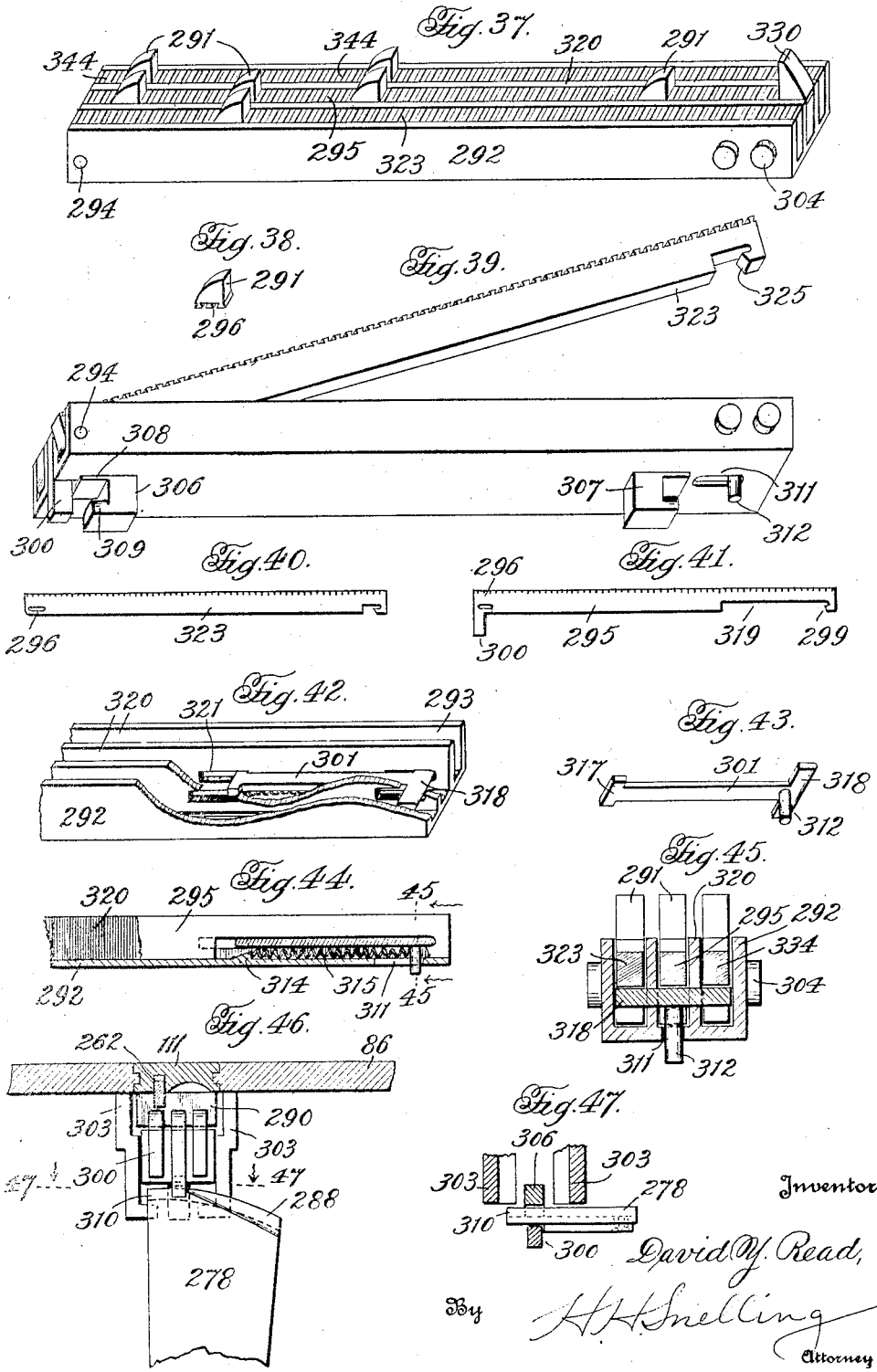

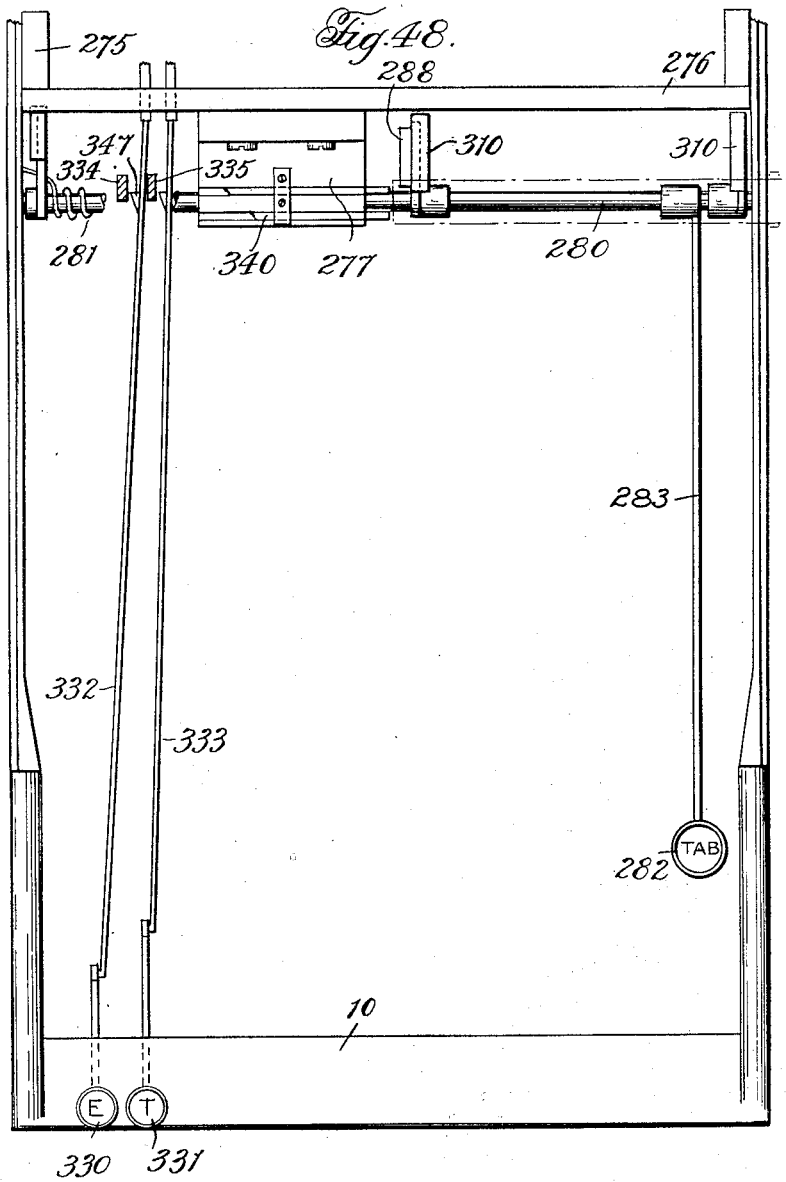

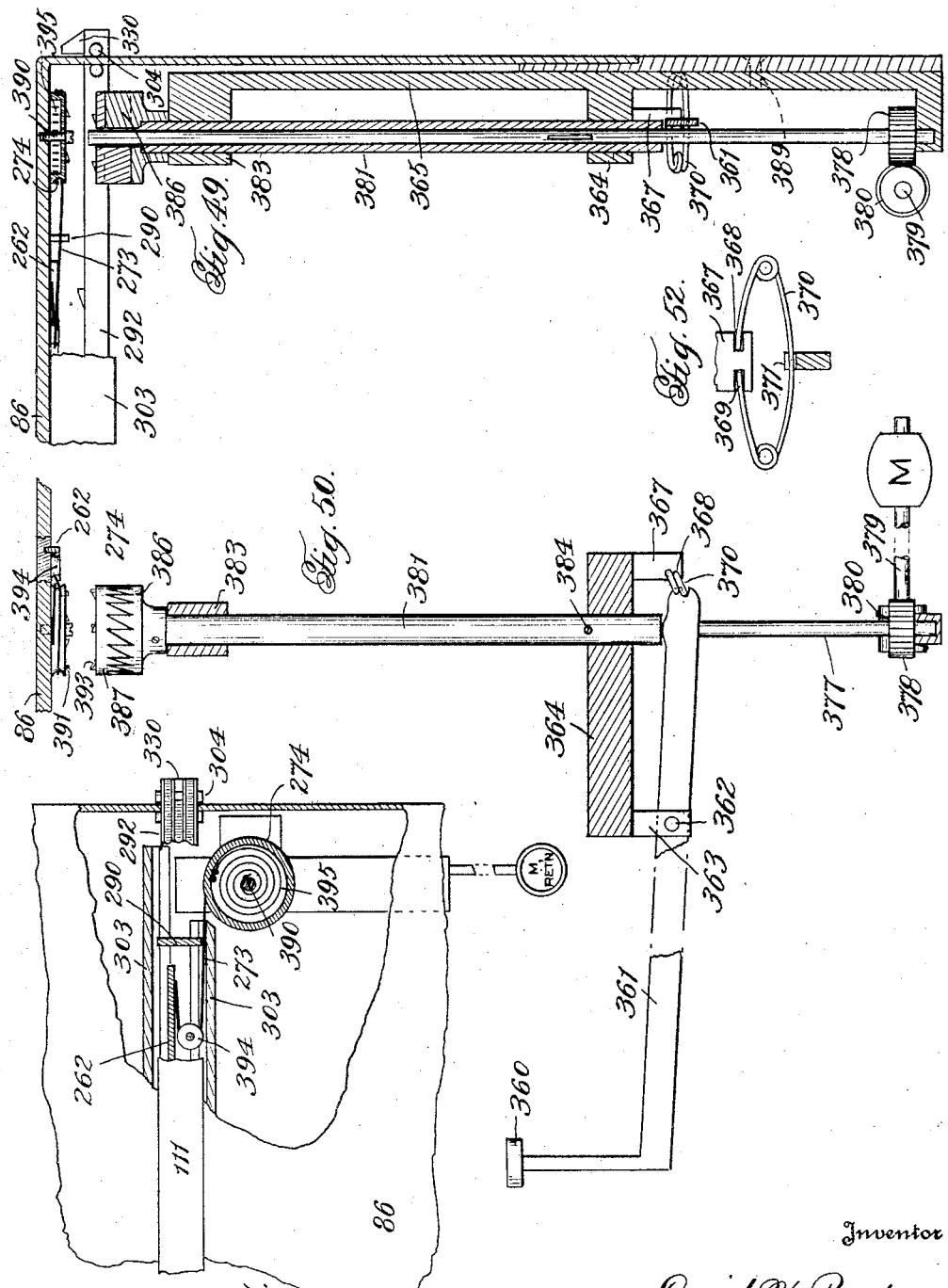

Nov. 15, 1932. D. Y. READ 1,888,144
VISIBLE WRITING CALCULATING MACHINE
Filed April 27, 1926 18 Sheets-Sheet 17
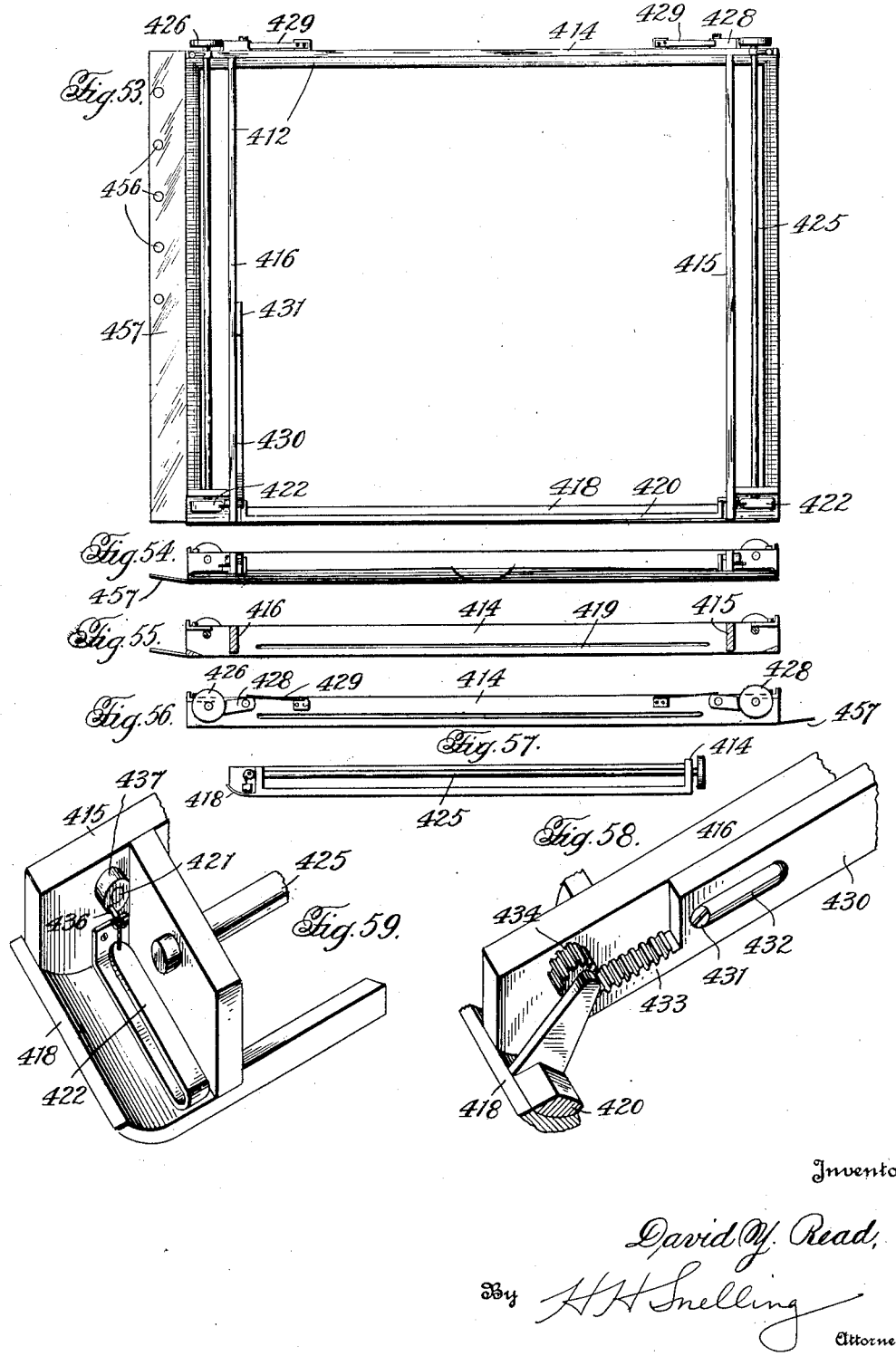

Nov. 15, 1932.  D. Y. READ  1,888,144
VISIBLE WRITING CALCULATING MACHINE
Filed April 27, 1926  18 Sheets-Sheet 18
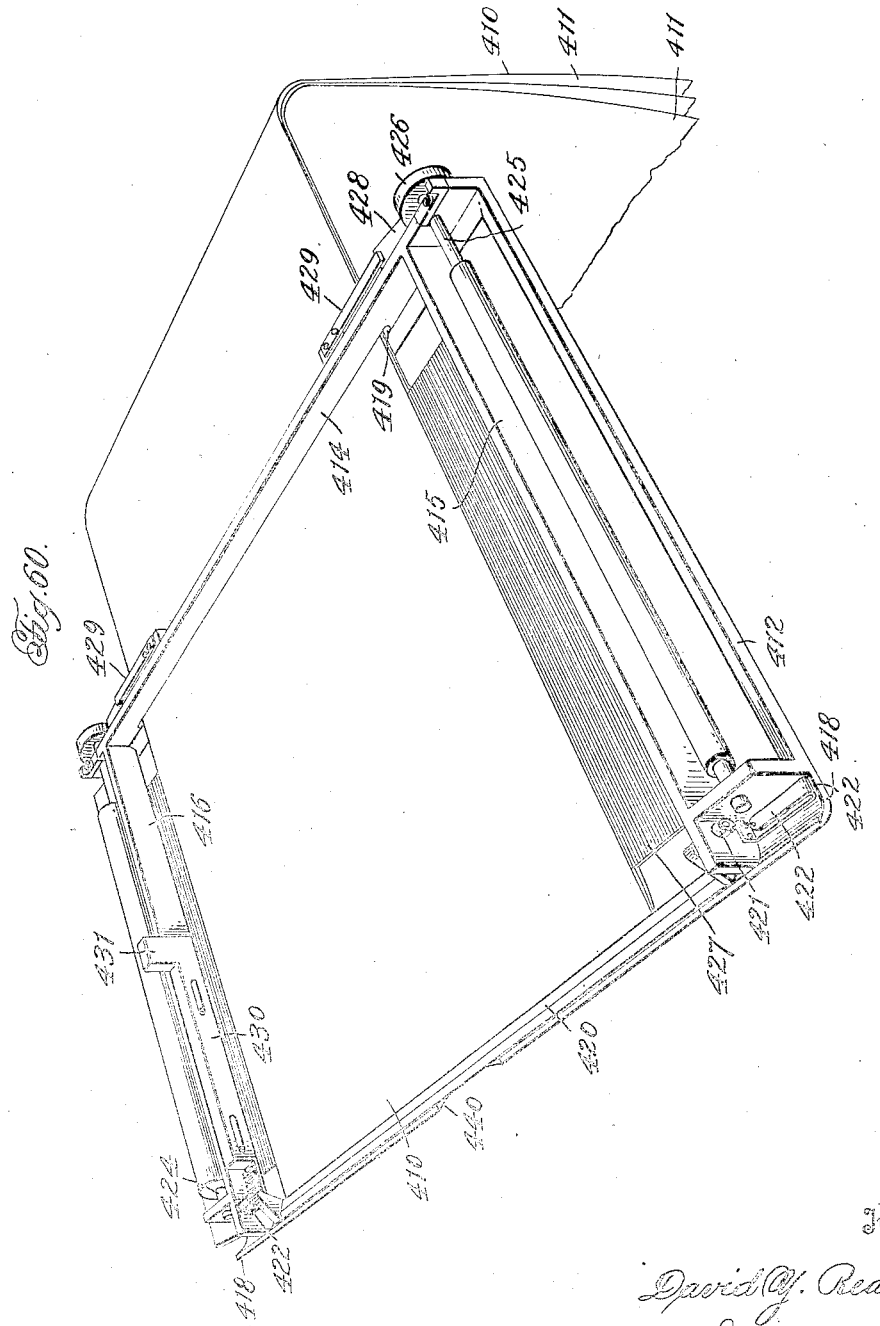

Patented Nov. 15, 1932

1,888,144

UNITED STATES PATENT OFFICE

DAVID Y. READ, OF WASHINGTON, DISTRICT OF COLUMBIA, ASSIGNOR OF ONE-FOURTH TO JESSIE P. GRANDY AND ONE-FOURTH TO HENRY H. SNELLING, BOTH OF WASHINGTON, DISTRICT OF COLUMBIA

VISIBLE WRITING CALCULATING MACHINE

Application filed April 27, 1926. Serial No. 104,968.

This invention relates to typewriting and calculating machines and has for its principal object the provision of a visible-writing, printing computing typewriter.

A further object of the present invention is to provide a machine of the character described in which the paper to be written upon lies flat and the writing whether by the typewriter mechanism or by the automatic printing mechanism of the listing style calculating mechanism is visible immediately after the impression is made.

A further and very important feature of the present invention is the provision of collating mechanism whereby forms of different sizes may be inserted in the paper holding mechanism with ease and dispatch which renders it very convenient for example, to write on one continuous sheet for a copy for one purpose and to insert a great number of other sheets at intervals for a different purpose. This feature is secured in the present invention by means which permit the release of the papers so that the operator may shift one form with respect to another and then by a simple movement lock his collated forms for writing, all the time maintaining each and all the forms in a flat condition and having the writing instantly visible in the fashion now common with up-to-date typewriting machines without computing mechanism.

A further object of the present invention is the provision of means rendering the computing machine far more versatile so that the operator may readily and conveniently convert the machine from a bookkeeping machine to a manifolding type of billing machine and in such billing machine to receive selectively a number of manifolding members and also to receive selectively a number of tabulating members.

A further object of the invention which is of great convenience in reducing the nervous strain upon an operator of this type of machine, is the provision of means by which the tabulating mechanism is operatively connected to the result key mechanism so that the operation of the result key is in no small measure rendered automatic and independent of the operator but nevertheless within her control at all times. To elaborate further: In all present types of calculating machines even tho the operator must go thru a uniform cycle for hours at a time she has no way of controlling the result keys automatically with the provision of rendering inoperative the state control mechanism. State control itself is not entirely new but it is invariably tied up with the carriage and consequently if the operator should move the carriage by hand to a definite setting on the scale a definite result mechanism would either be operated or be set and the operator is powerless to change that setting while the carriage is in that position. This object of the present invention includes the divorcing of the state control from the carriage movement and the placing of the state control in the hands of the operator at any and all times. Assuming that an operator is debiting and that the normal operation would require that she date the account and bill, write in the amount and index the price then multiply and print, and then add the product to the previous total. An exception can occur and not infrequently does as for example, when the total carried forward is a credit total. With ordinary machines it is not possible to change from one result to another when the typewriter carriage is shifted in any manner to the scale position where the first result is set. In the present machine however, the operator has two options: she may shift the carriage by hand to any place and at that place push the desired result key; or she may press the tabulator key which would automatically set some particular result key but when the carriage jumps she may then press the error key restoring the mechanism to normal and then press the desired result key, in this case the subtraction key.

A still further object of the present invention is the provision of a typewriter structure or a combined typewriter and calculating structure in which the supporting housing, casing, or frame is in two separate parts which are readily detachable and all the various mechanism is so positioned on either the cover or the base frame as to permit the direct vertical lifting of the cover from the frame, thus securing mechanical accessibility not possible in any other machine.

Other objects of the present invention relate to particular details and these objects are particularly set forth in the claims.

In the drawings:—

Figure 1 is a top plan view of the entire device.

Figure 2 is a front elevation.

Figure 3 is a top plan view of the forward part of the machine with the removable cover or hood lifted off.

Figure 4 is a vertical elevation taken approximately centrally thru the machine so as to show the platen bracket and ribbon housing in side elevation.

Figure 5 is a side elevation of the mechanism for operating the printing hammers and for shifting the platen as in adding.

Figure 6 is a top plan view of the devices shown in Figure 5.

Figure 7 is a top plan view of the paper advancing mechanism.

Figure 8 is a side elevation thereof.

Figure 9 is a vertical section thru the paper feeding rolls taken on line 9—9 of Figure 8.

Figure 10 is a top plan view of the carriage mechanism with capping plates removed.

Figure 11 is a side elevation of the carriage mechanism.

Figure 12 is a vertical section taken on the center line of the carriage.

Figure 13 is a vertical section taken on line 13—13 of Figure 10.

Figure 14 is a front elevation of the carriage.

Figure 15 is a vertical section thru the center of the post.

Figure 16 is a plan view of the variable spacing slide of the carriage mechanism.

Figure 17 is a vertical cross section on line 17—17 of Figure 16 but with the capping plates attached.

Figure 18 is a front elevation of the bar at the back of the carriage that serves to line space when used with the motor return and also as an escapement dog releasing mechanism.

Figure 19 is a perspective of the selective line spacing mechanism.

Figure 20 is a perspective of the bell crank lever of the line spacing mechanism.

Figure 21 is a perspective of the overthrow check dog.

Figures 22, 23, and 24 show the various positions of the overthrow dog in connection with the pin on the downturned end of the bell crank lever shown in Figure 20.

Figure 25 is a top plan view of the dog shown in Figure 21.

Figures 26 and 27 are top plan view and side elevation respectively of the main shaft of the escapement unit.

Figure 28 is a vertical section thru the driving pinion and rack, looking toward the operator.

Figure 29 is a view on a much smaller scale showing the general relation between the spacing bar of the typewriting machine and the escapement mechanism.

Figure 30 is a vertical section thru the escapement ratchet wheel looking toward the operator.

Figures 31 and 32 are fragmentary views of the mechanism shown in Figure 30 and showing the escapement wheel dog in different positions.

Figure 33 is an angular section taken thru the escapement mechanism showing the parts in isometric projection.

Figure 34 is a view of the escapement dog cradle.

Figure 35 is a side elevation of the levers of the tabulator mechanisms.

Figure 36 is a front elevation thereof.

Figure 37 is a perspective view of the tabulator rack assembly.

Figure 38 is a perspective of one of the tabulator stops.

Figure 39 is a perspective looking toward the bottom of the tabulator rack and showing the method of moving the individual bars to permit removal and insertion of stop members.

Figure 40 is an elevation of an ordinary tabulator bar.

Figure 41 is an elevation of the master tabulator bar which is preferably located in the middle of the tabulator rack assembly.

Figure 42 is a perspective view showing the location of the return slide with respect to the tabulator rack.

Figure 43 is a perspective view of the return slide.

Figure 44 is a vertical section thru the center of the return slide.

Figure 45 is a section taken on line 45—45 of Figure 44.

Figure 46 is an elevation of the tabulator rack and its guide so as to show the relation between this rack, the parts being shown in the position it would have taken when the tabulator rack is elevated and the retaining spring of the lever has caught beneath the rack to hold it in such elevated position.

Figure 47 is a horizontal section taken on line 47—47 of Figure 46.

Figure 48 is a plan of the base frame of the machine with the top removed showing primarily the tabulator mechanism. In this view the tabulator rack which is actually above is indicated in position by dot and dash lines and the main tabulator cross shaft is broken away to show more clearly the relation between the tabulator mechanism and the result keys of the calculating mechanism.

Figure 49 is a vertical section thru the motor return shaft and showing the tabulator rack in front elevation.

Figure 50 is a side elevation of the parts shown in Figure 49, this elevation being taken at an angle of 90° to Figure 49.

Figure 51 is a top plan view of the parts shown in Figures 49 and 50.

Figure 52 is a plan view in an inclined plane of the snap spring for holding the motor shaft sleeve in elevated position.

Figure 53 is a top plan view of the manifolding frame.

Figure 54 is a front elevation thereof.

Figure 55 is a central section.

Figure 56 is a rear elevation.

Figure 57 is a side elevation.

Figures 58 and 59 are perspective views of details of the mechanism.

Figure 60 is a perspective view of the manifolding frame showing the sheets of a billing form in place.

Figure 61 (sheet 8) is a perspective view of one of the bracket pins for holding the blade to the rail.

Figure 62 is a detail in plan of the type guide.

Figure 63 is a sectional detail of the type guide.

*General description.*—In the machine shown in the present application the calculating machine mechanism is generally of old and well known type, as is the mechanism for writing the letter characters but certain details have been altered to permit the two machines to be assembled and to permit the writing to be visible. The actual type characters both letters and numerals are positive whereas in all typewriting machines with which I am familiar the actual type characters are negative and the type characters strike the ribbon or the back of the carbon paper while in this machine the type characters strike against the typewriting paper or forms in the direction of the face of the carbon sheets and the faces of the type characters must therefore be positive. The carriage mechanism travels across a table and is of entirely new character which has necessitated the provision of a new and novel escapement mechanism. A particularly advantageous feature of the present machine is the provision of a hood 9 which may be lifted vertically off the combined typewriting and adding machine mechanism, this hood carrying virtually all of the novel details of the present invention save for the hammer operating mechanism shown in Figures 5 and 6 and the tabulating mechanism shown in Figures 48 to 52. The base frame 10 of the machine is of standard form being merely a combination of the bed or frame of an ordinary "blind" typewriter for the front and the frame of an ordinary printing computing machine here illustrated as a Hopkins calculating machine, the details of which are shown in Patent #1,336,904, April 13, 1920 to which further reference will hereafter be made. Except for the details shown in Figures 4, 5, and 6 no claim is made to the calculating machine mechanism per se, as it is intended to add the details of the present invention to the different commercial types of calculating machines with as few changes in the calculating machine as possible. While the combined machine is illustrated in the various figures as a combination of upstroke typewriter with Hopkins calculating machine it will be thoroughly understood the drawings are illustrative only and it is intended to combine any upstroke typewriter with any modern calculating machine of the general type called for.

The base frame 10 of the machine supports the entire typewriting basket 11 which it will be noted is merely a half circle and is so positioned that its center is slightly offset with respect to the operator, that is, the right hand edge 12 of the basket is further from the operator than the left hand edge 13, the latter preferably ending somewhat short of a transverse line thru the writing point so that the type bars to the left will not approach too closely the plane of the forward end of the adding and calculating machine rack bars 15. As the typewriter mechanism is illustrated no provision is made for shifting for capitals and/or numerals and the keyboard is therefore that of a billing typewriter or as used by telegraph companies.

The calculating machine rack bars 15 are of well known and old form at front and rear but the central point has been changed to accommodate the mechanism peculiar to the present invention and also the actual computing type characters are naturally positive instead of being negative as in all other calculating machines. The rack bars print the figures two spaces to the left of the printing point 20 for the typewriting mechanism as shown in Figure 3 and as usual in practice, so that a total may be printed and without any shifting at all the operator may typewrite any matter she desires.

*Hammer mechanism.*—We will now consider Figures 4, 5, and 6 in order to describe such changes as have been necessary to make in the calculating machine shown in the Hopkins patent. In Figure 63 of this patent is a cam 82 which is shown in Figure 4 of the present application as cam 21, being identical with the Hopkins cam 82 save for a slight shifting in the slot 22 which receives the pin 23 on the bell crank levers 24 and 25 pivoted to the rock shaft 26. In the present instance I have combined the Hopkins link 166 and Hopkins rock arm 167 into a single piece which is the long arm 25 of the bell crank lever and which is bent to clear the transverse brace 28. The parts which drive the cam 21 and also the rock shafts 26 and 29 are exactly as shown in the Hopkins patent.

The transverse brace 30 is a standard member of the calculating machine and I have secured to this brace a pair of side plates 31 projecting forwardly from the horizontal brace 30 and serving as supports for the pins 32 which rivet the two plates together and serve to guide the arcuate hammers 33 which strike the rack bar carried printing types 37 which are numbered from zero to nine in the usual fashion.

The two side plates also journal a pivoting pin 40 for the restraining pawls 41 which are operated by the camming surface 42 of the rack bars 15. Each of these pawls has two rearwardly extending arms, one 44 projecting in the path of the head 45 of the hammer 33 directly beneath it and the other a shorter angular arm 46 bent laterally to engage beneath the adjacent restraining pawl so as to raise it to permit a zero to be struck, this in accordance with usual practice. Each one of the hammers 33 has a lug 49 which may be caught by a gravity latch 50, this latch plate extending over all of the hammers and having its operating edge at the rear and substantially beneath the pivoting shaft 40 of the restraining pawls.

A frame, which I will call a sled for convenience of description, consists of two parallel flat bars 51 having cross pieces 53 and 54 at the front and rear respectively and having centrally a transverse bar 55 which restores the hammers after each printing. This sled slides upon pins 57 and 58 secured to each of the plates 31 and the rear pin 58 serves a dual function, i. e.. to guide the sled and also to guide the hammers 33. The bars 51 of the sled are each slotted to receive the transverse pins 57 and 58. A platen housing pivoting bar 60, supported and guided by the type bar cushion supporting ring 61 is secured to the sled in any desired manner as by the screw 62. The operation of this bar will be described in detail in connection with the movement of the platen bracket which is also the ribbon housing.

*Hammer operation.*—The operation of the mechanism described in Figures 5 and 6 is as follows: The operator strikes one of the ten keys of group A which causes the lever 63 to move about its pivot 64. As shown in Figure 4 each of these levers 63 is bent laterally at its end. We will assume that the character "4" has been struck. The fifth bar from the right, i. e., 65 will be raised and this will cause a pin (not shown) to rise and cooperate with the setting up devices in the indexing carriage diagrammatically illustrated at 66. This carriage in turn raises one of the stop pins in the stop pin box 67, such stop pin projecting in the path of the downturned lug 68 on the rack bar 15.

When the operator next presses the motor key 70, the rock shafts 26 and 29 are operated causing the rocking lever 72, having a slot and pin connection with the rack bars to position the rack bars as indexed. Since the rocking lever 72 is spring-pulled the rack bars will move forward until the stops 68 engage the pins in the stop pin frame 67 and this will position the printing types 37 beneath the platen in the printing line. The pressing of the motor key has also caused the rock shafts 26 and 29 to move and this will cause a forward movement of the cam 21 which is fast to the shaft 29 and by virtue of the pin and slot connection between the cam 21 and the bell crank lever 24—25 the longer arm will move forward about its loose pivotal connection on shaft 26 and this will move the sled in a direction toward the operator or to the left as seen in Figures 5 and 6. The forward movement of the sled will distend each of the springs 76 connecting the forward transverse bar 53 of the sled with the rear head of the hammers 33. The hammers however, are at this time held by gravity latch plate 50.

The forward movement of the individual rack bars 15, it will be remembered, has previously engaged the forward end of the restraining pawls 41 so that at the time the sled moves forward certain of these restraining pawls 41 have been moved entirely out of the arcuate path of the hammers. As the sled moves forward the cam surface 78 of the side plates 51 of the sled engage and raise the gravity latch plate 50 whereupon all of the hammers which are not held by the restraining pawls 41 simultaneously fly under urge of their individual springs 76 and strike the respective printing types 37 which are themselves spring-pressed in the usual and well known manner.

On the return movement of the rock shaft 29 the arm 25 is moved rearwardly carrying with it the sled, the cross bar 55 which engages the lower portion of the head of each hammer which has just moved up to printing position and pulls these hammers rearwardly until the gravity latch plate 50 drops back into position just forward of the lug 49. It will be understood however, that the actual holding rearwardly of the hammers is due to the transverse bar 55, and the hammers in normal position are not in engagement with either the gravity latch plate 50 or the restraining pawls 41. During the return movement of the sled the rack bars 15 have returned to rearward position thru the intermediation of the usual mechanism, and the ribbon 79 has advanced the customary slight amount as described in detail in my application, Serial Number 87,075, filed February 9, 1926.

*Paper advancing means.*—Referring now particularly to Figure 4 the platen bracket and ribbon housing pivoting bar 60 is reciprocated with each movement of the sled. At its forward end this bar is guided in the ring 61 and beyond this point the bar is enlarged and supports a deflector 80 which causes the platen bracket 81 to move about its support on the paper shelf assembly 82 which is fast to the hood. The bracket 81 receives its entire support from the assembly 82 and is secured to a hollow sleeve 83 fitting snugly in the cylindrical bore of the paper shelf assembly 82 to the top of which is threaded an adjustable ring 84 so as to permit extremely fine adjustment between the writing face of the platen and the table 86 of the machine. The arm 85 is secured to the sleeve 83 and has two downwardly projecting lugs 87 which are spaced far enough apart to receive freely the deflecting plate 80 of the bar 60. When the bar moves forwardly the plate 80 engages the left hand lug 87 as seen in Figure 2 and moves the arm 85 and consequently the bracket 81 to the left which brings the platen 88 into position to receive the printing types.

Referring now particularly to Figure 9, 90 is the bottom wall of the ribbon housing, 91 is the vertical wall and 92 represents detachable plates so as to permit ready access to the ribbon feeding mechanism contained within the housing and described in my previously mentioned application. At the bottom of the housing I attach a spring 93 having teeth 94 at the free end thereof in such position as to drive a small gear 95 on a longitudinal shaft 96 carrying at its far end a beveled wheel 97 driving a shaft 98 to which is fastened a pair of rollers 99 which form the paper advancing means. Both of the rollers 99 engage a single roller 100 pivoted to the flat upper writing surface 86 of the hood. On the forward journey of the bar 60 the teeth 94 will idle over the gear 95 but as the housing and platen return to normal position by return of the bar 60 the teeth 94 will engage the gear 95 and consequently will drive the rolls 99 and 100 and advance the paper.

The main section of the paper receiving basket is a somewhat cylindrical sheet of metal 103 preferably secured to the assembly 82 which in turn is substantially permanently secured to the front wall 102 of the hood. A separate section 104 is hingedly connected to the section 103 and to this in turn is pivoted a flat metal shelf 105 which carries the shafts 96 and 98 and the elements mounted thereon so that when desired the shelf 105 may readily be thrown toward the operator about its pivot 106 and may be held in such position against the springs 107 by means of a small catch 108 on the section 104. The parts are shown in folded back position in full lines in Figure 4 and in dotted lines in Figure 8. The shelf 105 is thrown back toward the operator in ordinary typewriting but is thrown away from the operator so as to cause engagement between the rollers 99 and 100 when the machine is used as a listing machine.

In the ordinary use of the machine the shelf 105 is thrown back toward the operator and in this position almost all work is carried out but it sometimes is advantageous to list a number of items as for example in straight addition. To accomplish this the platen housing 81 is first raised vertically up to free the bar 60 from the two lugs 87. At this time the platen housing may be moved freely to the operator's right about the axis of the sleeve 83 which sleeve is slotted to permit this movement. With the platen housing thrown to one side a roll of ordinary listing paper is pushed sideways into the basket 103 and placed over the roller 100. The shelf 105 is then released by pulling the catch 108 to the right as seen in Figure 7 at which time the springs 107 throw the parts to the position shown in full lines in Figure 8 and cause the upper rolls 99 to hug the lower roll 100 to insure the feeding of the adding or listing paper. The platen and ribbon housing 81 is now moved to normal position which entails no difficulty since the right hand lug 87 is beveled to allow it to ride freely over the deflector 80 and to guide the latter in place.

*Paper holder.*—The carriage consists in general of the rail frame and a paper holder mounted to have forward and backward movement with respect to one rail and to move from side to side with two other rails, the three rails being permanently connected together to form an H-shaped structure which will hereafter be called the rail frame. The hood top or table 86 is slotted to receive the two parallel grooved rails 110 and 111 which are connected together permanently by the longitudinal line space rail 112 which lies entirely above the table 86 and is the sole support for the paper holder denoted as a whole by the numeral 114. The escapement rails 110 and 111 are preferably grooved on each side as illustrated to guide the rails in a plane with the table and to support them from the table.

Referring particularly to Figure 10 which shows a plan view of the paper holder and the line space rail, in which it will be noted the operator is seated at the right hand side of the figure, in other words the figure is a plan looking from the side, a rock shaft 118 is rotatably mounted in bearings 119 and 120 on the escapement rails 111 and 110 respectively. A mutilated gear 121 is fast upon the far end of the rock shaft 118 and a spring 122 is secured to the gear 121 and to the bearing 119 and tends to hold the gear and rock shaft in neutral position. A handle 125 is integral with or carried by a sleeve 126 which is slidably mounted on the rock shaft 118 but has a lug 127 loosely received in a groove 128 extending the entire length of the rock shaft 118 as shown in Figures 15 and 17.

The sleeve 126 has at its top a striking element or tooth 129 adapted to engage the downturned portion 130 of a link 131 pivoted as at 132 to the short arm 133 of a bell crank lever pivoted at 134 to a slide 135 so that the movement of the handle 125 in a direction to the operator's right, that is toward the post, will cause the long arm 137 of the bell crank lever to move away from the post and idle over the teeth 140 of the central or line space rail 112. When the handle 125 is released a strong spring 141 restores the bell crank lever and the downturned end 201 will engage a tooth and move the paper holder one step away from the operator thus line spacing the paper being written upon. While the sleeve 126 is free to slide on the rock shaft 118 it is constrained to move with the paper holder by virtue of a small retaining lug 144 fast to the paper holder and riding in a slot in the sleeve 126.

As stated the rail frame formed by the two parallel rails 110—111 with the cross rail 112 moves as a unit with each stroke of a typewriter key by means of mechanism which will later be described. The body 150 of the paper holder surrounds the rail 112 on three sides and is guided thereby. It has a paper shelf 151 extending to the right, forming the lower jaw of a clamp for holding the paper, the upper jaw 152 of which is in the form of a box which is vertically movable with respect to a pair of brackets 154 carried by the body 150. A sliding member 155 is slotted as at 156 to receive pins 157 secured to the bracket 154 so that as the handle 160 is pressed away from the operator, i. e., to the left as seen in Figure 13, the jaw member 152 will be raised from the shelf 151 so that paper may be inserted between the two jaws.

I preferably mount a plurality of cutters 162 in the lower jaw which tightly fit bores in the member 152 and use these to hold sheets of carbon paper. The full throw or the movable paper jaw 152 by the lever 160 brings the holes in the member 152 away from the cutters 162 but this movement is had only when it is desired to add fresh sheets of carbon paper. Under other circumstances the handle 160 is moved only half way at which time the small latch 163 catches in a small notch in the upper surface of the slide 155 and holds the parts in this position while paper is inserted between the two jaws. By releasing the latch or trigger 163 the spring 165 returns the slide 155 and holds the paper between the jaws. The peculiar box-like shape of the member 152 facilitates the use of the upper jaw as a holder for the circular bits of carbon paper cut by the punchers 162. To prevent littering by the scattering of these pieces I provide thin metal covers 168 for the member 152. In Figure 10 these three covers are omitted for the sake of clearness.

*Collating.*—The collation feature is of great importance as by it the operator may write with ease upon a number of forms each of different size and any one or more of which may be continuous for the run of the work. In such cases the continuous forms may be perforated by the paper holder and kept permanently in the clamp by being held on the studs 162. As a typical example we will assume the continuous form in this case is a journal sheet on which the postings are entered. Sheets from the individual ledger accounts are brought into registry after moving the handle 160 to half release position. The operator now has both hands free so that she can bring the ledger sheet into exact registry with the next line to be written on the journal sheet and it is quite immaterial how small the ledger sheet is compared to the journal sheet.

When the parts are in collated position the operator strikes the trigger 163, and makes the entry which is in general but a single line. In this connection it should be remembered that extreme quickness of feeding the sheets into the holder is possible. With other machines the papers after being assembled into registry are either rolled around the roller and under a couple of resilient paper fingers or else the heavy machine itself is lowered over the papers thus requiring a complete operation more than in the present case wherein the securing of the papers in the holder after registry is accomplished by the striking of the trigger only.

*Variable line spacing.*—The slide 135 is secured to the paper holder body 150 and to the integral post 170 thereof by means of a vertical plunger 171 having a tapered lower portion 172 which engages a corresponding beveled surface of a slot 173 in the slide. A spring 175 resiliently holds the post in engagement with the slide which parts move ordinarily as a unit but by depressing the thumb piece 176 the slide is released from the post so that by moving the post the relative positions of the paper holder and slide may be altered. The elements just described are used for what is commonly called variable line spacing as by depressing the thumb piece 176 the paper held between the jaws 151 and 152 can be moved a desired distance with respect to the rail frame without altering the engagement of the roller 180 with the teeth 140 of the longitudinal or line space rail 112.

*Line spacing.*—The line spacing roller 180 is carried by a spring 181 secured to the slide 135 by means of fastenings fitting in the holes 182 shown in Figure 16. The roller 180 and the downturned ears 183 of the spring 181 are shown in this figure but the main portion of the spring 181 is not shown as it is above the plane of the figure. The roller 180 may be thrown out of engagement with the teeth 140 by means of a small crank 186 having an eccentric thereon to engage the lower surface of the spring 181. When the operator draws the little handle 186 toward her the spring 181 is cammed up and held in such position allowing the paper holder to slide freely forward and backward on the longitudinal rail.

Referring particularly to Figure 19 the slide 135 has a bore 187 slidably receiving one end of a spring wire 188 having an upturned end 189 having a knob 190 secured thereto. The spring wire 188 also has a lateral branch 191, the end of which pockets in one or the other of two holes in the wall of the slide 135. The upturned end 189 of the wire rides in a bayonet slot, the nearest bay to the operator being the position in which the knob 190 normally seats, this giving double spacing whereas if the wire is seated in the rear bay 193 with the extension 191 in the hole 194 single spacing will be had. The fit of the long end of the wire 188 is snug and the resilience of the wire holds it in one or the other of the bays as set.

*Overthrow check.*—Referring now particularly to Figures 22, 23 and 24 the central carriage rail 112 is relatively stationary. When the handle 125 is released the spring 141 moves the slide and body away from the operator. Since the wire end 191 is relatively fixed with respect to the slide it would appear in these three figures as if it were moving to the left. An overthrow check dog 204 pivotally mounted on the wire 191 therefore moves so that its camming surface 205 strikes a pin 200 laterally projecting from the downturned vertical end 201 of the arm 137 of the bell crank lever. This throws the forward end of the dog 204 downwardly. The wire 191 meanwhile strikes the bevel edge 207 of the end 201 thereby camming the end 201 upwardly out of engagement with the teeth 140 of the rail 112. The parts are now in the position shown in Figure 23, the end of the overthrow check dog 204 having struck the curved surface of a tooth 140 and checked the inertia of the parts.

The spring 141 however, still continues to act and since the end 201 is now clear of the teeth the parts will come to rest in the position shown in Figure 24 with the pin 200 in the recess 210 in the overthrow check dog 204 and the wire 191 in the right angular recess of the downturned end 201 of the resilient arm 137 of the bell crank lever. There is sufficient resilience in the arm 137 to cause the end 201 to rest firmly on the wire 191. In moving from the position shown in Figure 23 to the position shown in Figure 24 the bevel edge 207 strikes a pin 211 on the dog 204 raising the far end out of engagement with the teeth 140. There is also an integral lug 212 on the dog 204 which rests on the top surface of the slide to keep the forward end of the dog from rising higher than as shown in Figures 22 and 24 when the arm 137 is away from home position.

*Escapement.*—This mechanism (Figures 26 to 34) is located at the left of the typewriter as a whole, and is suspended by means of a bracket 220 which is fast to the flat top or table of the machine. Screws 221 pass thru the bracket up into the table 86 and hold the bracket in such position that a slight amount of space is left between the escapement mechanism and the left side wall of the typewriter.

The escapement consists of a main shaft 222 having at the ends thereof cog wheels 223 and 224 in mesh with the racks 225 and 226 cut into the lower surface of the two side rods 110 and 111 of the rail frame. Just inward of the far cog wheel 224 is a ratchet wheel 230 which is held against one of the escapement dogs by means of a main spring 231 preferably encircling the shaft 222. The reason for having two of the cog wheels is to preserve alinement of the carriage and to prevent friction caused by the skewing of the carriage should there be but one driving gear.

The two dogs, namely, the stationary dog 232 and the stepping dog 233 are carried by a member 234 which I will term the cradle, the dog 232 being an integral part of the cradle, while the stepping dog 233 is given a plurality of movements with respect to the cradle to provide for the various movements necessary in the operation of the machine.

The bracket 220 is held to the bottom side of the table by the screws 221 and at its far end has a pair of forwardly extending lugs 235 and 236 affording a pivotal mounting for the trunnions 237 of the cradle, these trunnions being integral with this member. The cradle, denoted as a whole by the numeral 234, has a rectangular slot 238 extending vertically thru the member, guiding and affording room for the stepping dog 233. The two legs 240 and 241 of the cradle provide means of support for the springs 242 and 243 respectively, and in addition to the longer leg 240 serves as a means for rocking the cradle about its trunnions 237. The center of the spherical bearing 256 is in the axis of the trunnions 237 and also in a plane thru the axis of the main shaft perpendicular thereto and containing the working face of the stationary dog.

The operating connections consist of a pin 245 extending at right angles to the flat portion of the longer leg 240 and engaging the forked slot 246 of a rocking lever 247 pivoted to the side wall of the typewriter as at 248 and having a side to side extending shelf 250 which just clears each of the key arms 251 so that when a key 252 is depressed the forked end of the rocking lever 247 will move forwardly causing the top of the cradle and with it the dogs to move forwardly, so as to bring the permanent dog 232 into the tooth of the ratchet 230 while freeing the stepping dog so that it can move to the right under urge of the spring 242, so that when the cradle is returned to dwell position under urge of the spring 254 mounted on the cylindrical enlargement 255 of the trunnion 237 it will engage the next tooth of the ratchet 230.

The stepping dog 233 is integral with its bearing which consists of a ball 256 fitting in a socket in the split end 257 of the release rod 258 which has an integral vertical extension 259 terminating in a slightly enlarged adjustable head 260. A spring 261 keeps the member 260 which might be termed a plunger, elevated and holds the dog 233 in contact with the ratchet, but pressure upon the plunger 260 compresses the spring 261 and lowers the dog 233 out of contact with the ratchet wheel 230 allowing the carriage to move to the end of its travel, or until the plunger 260 is released.

Suitable mechanism is also provided whereby this plunger 260 is pulled down when the tabulating key is struck. Ordinarily the plunger 260 is operated by means of the blade 262, which is controlled by the release lever 125 which operates the blade in a downward direction. In order to permit the carriage to move freely in the return direction I provide the short spring 243 secured to the shorter leg 241 of the cradle and which takes hold of the dog 233 at the end of the movement of the longer spring 242 so that as the ratchet wheel 230 is turned by the main shaft in a counter-clockwise direction, as seen in Figure 32, the dog 233 will be free to move to the right compressing the spring 243 which will restore the dog to normal position just as soon as the carriage becomes stationary.

The bracket 220 and the mechanism carried by it can all be removed from the hood as a unit. In the designing of the device care has been taken to obviate all movement of interacting parts between the movement units and the body that would prevent the lifting off of the hood of the machine. Care must be taken, however, not to depress the plunger 260 while the escapement unit is removed from the hood, as in so doing the main spring 231 would be entirely free as it is held only by the dog 233 which acts as a pawl.

*Carriage release.*—Extending practically the entire length of the rear rail 111 of the carriage is the blade 262 (Figure 18) which carries a rack in two sections, one a horizontal section 268 and the other a sloping section 269 both of which mesh with the gear 121 fast on the rocking shaft 118 which may be operated by the release lever 125. The blade 262 fits loosely in a groove in the bottom of rail 111 and extends the entire length thereof. The blade is held to the rail by its engagement with the groove and also by a plurality of brackets 271 fastened to the rail 111 at intervals and each fitting within a slot 270 in the blade.

The blade may be depressed by hand by pushing the lever 125 away from the post which the operator can do very conveniently with the back of her hand. This back movement causes the lug 127 to engage the groove 128 in the rock shaft 118 without any lost motion and it causes the gear 121 to move counter-clockwise as seen in Figure 18, thereby lowering the blade 262 as far as the bracket pins will permit which is sufficient to move the head 260 against its spring 261 to release entirely the stepping dog 233 from the ratchet wheel 230, so by holding the lever 125 away from the post the operator may move the carriage to any extent she wishes in the direction the carriage escapes in writing.

At the right hand end, as viewed from the operator, the blade 262 is secured by means of a flexible cord 273 to a drum 274 which will be described in full in connection with the motor carriage return.

*Tabulator operating mechanism.*—At a point just a little back of the rear rail 111 (Figure 35) I secure to the bottom frame of the typewriter a pair of uprights 275 which are secured together at their top portions by a horizontal beam 276 which serves as a support for a hanger 277 and also to form a rest for the tabulator levers 278 which are fast to the main tabulator shaft 280 journaled in the base frame of the machine. A relatively heavy spring 281 surrounds the main shaft 280 and holds the levers 278 against the beam 276 so as to hold the tabulator key 282 in its normal elevated position.

At the left hand side of the machine the main tabulator shaft 280 carries an escapement release lever 284 which has an outwardly turned lip or flange 285 of cam shape which engages a hook secured to and substantially integral with the release plunger 260. Depression of the tabulator key 282 causes the flange 285 to engage the hook 287 and pull it downward against the tension of the springs 261 and 281 and thereby to lower the stepping dog 233 out of engagement with the ratchet wheel 230 and consequently to release the carriage. The main tabulator shaft is locked in position with the key depressed by means of a resilient locking spring 288 on the central tabulator lever 278 as will later be described.

The shaft remains thus locked until the carriage comes to rest when the shaft is automatically released. This feature is novel with the present structure as in all other typewriting and calculating machines it is essential for the operator to hold the tabulator key down until the carriage comes to rest as otherwise the release of the ordinary tabulator key would cause the carriage to come to rest at a point earlier than intended. Simultaneously with the lowering and release of the stepping dog the tabulator rack assembly shown in Figure 37 is elevated so as to cause one of the tabulator stop members such as shown in Figure 38 to rise into the path of the downturned lug 290 of the rail 111 so that when the downturned lug 290 strikes the stop member such as 291 the carriage will be brought to rest.

*Tabulator rack assembly.*—Referring now particularly to Figures 37 et seq. on sheet 14, the tabulator rack assembly consists of a case 292 having a plurality of grooves 293 each of which accommodates a rack bar pivoted to the case by a pin 294. The most important of these bars is the master bar 295 shown in Figure 41. This bar, like the others, is slotted at one end as at 296 to receive the pivot pin 294 but adjacent this slot it carries a downturned lug 300 which rides in a slot in the bottom of the case 292 so as to engage the locking spring 288 which holds the tabulator key depressed.

At the top of all of the rack bars are teeth conforming to the typewriting spacing, generally a tenth of an inch, and receive interlocking teeth 296 on the stops 291 which may be set on the rack bars in desired positions to stop the carriage. The case will preferably be scaled to correspond with the typewriter scale and to render it more convenient to slip the stops in place on the various rack bars. At the right hand end, that is the end away from the pivot, each one of the rack bars has a hook 299 which is caught by the rounded edge of a return slide 301 which also serves to hold the rack bars against accidental displacement upward from the tray or case 292.

The case 292 is supported from the table 86, i. e., the top of the hood, by means of two similar downwardly extending brackets 303. The case also extends slightly beyond the right hand margin of the machine as a whole and side to side movement of the case is prevented by a plurality of integral lugs 304 on each side of the case, one of each pair engaging the outer wall of the hood while the other engages the inner wall as best seen in Figure 51. The case 292 is therefore substantially immovable from side to side but has however, an up and down movement caused by the following mechanism.

A pair of lugs 306 and 307 each have a pair of lever engaging projections 308 and 309, the latter in each case being outwardly directed and rounded since the flanges 310 of the levers 278 face each other. Upon depresion of the tabulator key the cam flanges 310 at the tops of the levers 278 engage the projections 308 and consequently lift the tabulator rack assembly from normal position to the position shown in Figure 46. In this figure the locking spring 288 has been depressed by the downturned end 300 of the master tabulator bar but has snapped up after passage of that end into position to prevent the lever 278 from returning under urge of the spring 281. The assembly therefore remains elevated until the downturned end 290 of rail 111 strikes the proximate stop 291 on the master tabulator bar. The striking of these elments together causes the master bar to move to the left and out of the path of the spring 288 thus freeing the lever 278 and permitting the main tabulator shaft 280 to return to normal position, which action lowers the tabulator assembly out of contact with the downturned end 290 whereupon the carriage comes to rest by virtue of the engagement of the now raised stepping dog with the ratchet wheel 230.

While the carriage is coming to rest against the escapement dog after having been arrested by the stop 291 the tabulator rack bars or as many of them as have been driven back, including always the main bar 295, are moved forward sufficiently to restore them to normal position, this movement being accomplished by the device shown in Figures 42, 43 and 44. It must be remembered in this connection that while the tabulator rack bars themselves have a side to side movement, there is no movement in this direction of the case 292 which is held against such movement by the four pins 304. The case 292 has a small slot 311 to receive slidably a finger piece 312 on the return slide or latch 301. To the left of the slot 311 and in line therewith is a lug 314 between which and the finger piece or pin 312 is a rack bar restoring spring 315 which moves the rack bars back to normal position as soon as the assembly is lowered sufficiently to take the one or more stops 291 out of engagement with the end 290.

The slide 301 is best seen in Figure 43. It consists of an elongated body having a cross piece 317 at the rear and a somewhat larger cross piece 318 at the front, the latter being a universal cross head engaging the hook ends 299 of each and everyone of the bars. The rear cross piece 317 is merely a guide and does not engage any of the rack bars since the master bar 295 is cut away as at 319 the length of this slide. The two partitions 320 adjacent the master rack bar 295 are slotted as at 321 to receive and guide the rear piece 317 of the return slide.

The operation of the slide is as follows: We will assume that the two stops 291 nearest the middle of the assembly as shown in Figure 37 are set to engage the downturned end 290 of the rail 111. When the tabulator key is pressed the end 290 strikes the stops 291 and because of the pivoting slots 296 in the two bars, one the master bar 295 and the other an auxiliary bar 323 they are both free to move rearwardly of the case compressing the spring 315 as far as the slots 296 will permit. The carriage is temporarily arrested in this position. The backward movement of the master rack bar however, frees the latching spring 288 and consequently the rack bar assembly is lowered by withdrawal of the levers 278 whereupon the slide 301 and its spring 315 restore simultaneously both of the rack bars which have been operated.

A further use of the slide is a manually controlled latch. When it is desired to alter the position of a stop 291 the finger piece 212 is moved rearwardly of the case and the desired rack bar 323 or 295 as the case may be, is moved about its pivot 294 to the position shown in Figure 39. The stop member 291 is pushed off the rack bar laterally and is replaced by a similar sliding movement into the new adjusted position. The rack bar is lowered and while the beveled surface 325 of the hooked end of the rack bar might be made to accommodate this automatically I rather prefer that the operator be forced to move the finger piece inward a slight distance and then when the rack bar is in place the releasing of this slide will latch the bar down and will also lock in place everyone of the stops inasmuch as their teeth 296 are below the upper margin of the partitions 320. It might be mentioned here that whenever a stop is altered in position the corresponding stop on the master bar must also be changed as otherwise the carriage would come to rest but the rack bar assembly unit will not be lowered for the latching spring 288 would hold it elevated if the releasing end 300 of the master bar were not moved rearwardly.

*Margin stop.*—A unique feature of the present invention is the provision of a margin stop on the master tabulator bar. This margin stop 330 is similar generally to the stops 291 but is reversed and is preferably somewhat larger and necessarily higher. This stop 330 is at the right hand side of the case and consequently controls the left hand margin which as a rule is the only margin used in bookkeeping machines. The margin stop 330 in the views is shown at its extreme right hand position but naturally may be shifted in exactly the same way as the other stops. It operates by being struck by the downturned end 290, there being no yielding of the master bar in this direction since the pivot pin 294 is held at the limit of its travel in slot 296 by the spring 315. The entire assembly is loose in the hanger 303 and may be lifted vertically out of position by raising the end having the pins 304 and as soon as it is free of the side walls it may be slid directly out of its guide. At this time it will be remembered the levers 278 are entirely to one side of the brackets 303.

*State control.*—The tabulator assembly has a further and important function which is believed to be novel, namely, the tabulator assembly depresses certain of the result keys saving the operator this duty.

In the front of the machine are certain keys generically called result keys. These vary in kind and number with the various designs of calculating machines. In the Hopkins machine here used to illustrate the mechanism these result keys include the total key for the front register; the total key for the rear register; the introducing key for the rear register; and the extending or introducing key for the multiplying mechanism. In more recent models of this same machine and in machines of other design there are other result keys such as: subtract key; sub-total key; non-print key, etc.

In billing or bookkeeping work it is necessary for these keys to function constantly in cycles sometimes, and irregularly at other times. Manual manipulation is confusing, burdensome and subject to error. Mechanical manipulation by means of the carriage is limited in its practical usefulness because of inflexibility. By inflexibility is meant that when the carriage at a particular point functions the mechanism into an adding state or a subtracting state or a non-print state, it always does so at that point in its travel. This renders carriage actuation of the result mechanism impractical in many instances.

The present device makes the automatic setting of the result keys optional. When the carriage moves to a certain point it may or may not function them according to whether or not the operator has tabulated the carriage into that position or has moved it there by hand. By divorcing the state control mechanism from the carriage it also becomes possible to release any result key which has been set as a consequence of tabulating, by pressing an error key which can not be done when the carriage rigidly sets the state control mechanism. Total keys are also operated without subtotalling only.

Referring now again to Figures 35 and 36 and also to Figure 48 which shows the parts in plan view: Depression of the keys 330 and 331 thru the well known and old bell crank mechanism pulls forwardly the wire pull rods 332 and 333 which operate the appropriate mechanism as shown fully in the Hopkins patent before mentioned. These pull rods 332 and 333 lie to one side of levers 334 and 335 held fast to the rod 280 by pins 346, which serve as fulcrums for the two levers. As shown in Figure 36 the two levers are held by springs 336 so that their top portions are to the right and their bottom portions to the left of a vertical plane thru their pivoting pins. The two levers always move with the shaft 280. The top of each lever is received in a crotch 338 in a sliding member 340, the crotch having width enough to retain the ends of the levers in all positions of their travel both about their fulcrum and about their pivotal axes.

All of the sliding members 340 are supported and guided in the hanger 277 and the springs 336 hold them forwardly or to the right as shown in Figure 36 so as to just clear at their forward ends the rear of the tabulator rack assembly at which time shoulders 341 on the slide members 340 strike the rear or left hand bottom edge of the hanger. The sliding members 340 agree in number and are aligned with the rack bars of the type shown in Figure 40. In the embodiment of the invention illustrated there are only two of these auxiliary rack bars, the rear bar cooperating with the extending slide 340 while the nearer rack bar 344 which is identical in size and shape with the rack bar 323 cooperates with the totalizing mechanism.

*State control operation.*—These devices can perhaps be better understood from a description of the actual operation: We will assume that the carriage is in such a position that when the tabulator key is next struck the carriage will jump until halted as for example by the two stops 291 in about the center of the case as illustrated. One of these stops is on the master bar and the other is on the rear or extend rack bar 344. Both are struck simultaneously by the downturned end 290 of the carriage rail 111 and both simultaneously move backward against the force of the spring 315 (Figure 44). The backward movement of the master bar releases the locking spring 288 as previously described and the rearward movement of the extending rack bar 344 causes the movement in the same direction of the sliding member 340 which moves the upper end of the lever 334 about its pivoting pin 346 fast to the shaft 280 and consequently moves the lower end of the lever 334 inward with respect to the machine as a whole and into the path of the lug 347 on the pull rod 332 which up to this time has been stationary.

As the tabulator key 282 returns to normal position and with it naturally the main tabulator shaft 280 the lever 334 which is fastened to the shaft 280 by the fulcrum pin 346 moves its lower end toward the operator and since it lies in the path of the lug 347 it depresses the extend key 330 and thru the pull rod 332 operates the extending mechanism of the calculating machine. While these various actions have been described as if they took place slowly it will be understood by those skilled in the art, the action is a very rapid one and the lower ends of the levers such as 334 position the result mechanism before they can be snapped free of the lug 347 by the returning tabulator mechanism.

*Motor carriage return.*—While naturally the typewriter carriage can be returned by hand it is convenient to provide means to save the operator this extra exertion. I therefore provide a carriage motor return key 360 mounted rather high above the level of the horizontal portion of its lever 361 so that the key itself may be in line with the letter keys and the lever may be below all of the letter key bars and also the space bar levers. The lever 361 is pivoted at 362 between a pair of depending ears 363 on the central bracket 364 of a casting 365 which supports most of the motor carriage return mechanism.

A downwardly projecting lug 367 is bored on opposite sides as at 368 to receive the ends 369 of a double convex spring 370 which acts as a toggle to keep the rear end of the lever 361 either all the way up or all the way down. The center of this spring 370 is received in a kerf 371 in the lever 361 which passes outside or just to the right of the vertical motor shaft 377 having on its bottom a gear 378 receiving power from a motor shaft 379 thru a worm 380. A sleeve journaled in the central bracket 364 and also in an upper bracket 383 of the casting 365 is splined to the constantly revolving vertical shaft 377 by means of a rounded end screw 384 which fits loosely in a slot 385 in the shaft 377 so that while the sleeve 381 is forced to revolve with the shaft 377 it may move vertically with respect to it when the lever 361 is moved about its pivot 362 since this lever lies tight to the shaft 377 and engages the bottom of the sleeve as best seen in Figure 49.

Fast to the top of the sleeve 381 is a head 386 having a cooperating member or collar 387, forming with it a clutch. The head is fast to the sleeve and forms its support, this clutch element having a bearing on the top surface of the upper bracket 383 of the casting 365 which by the way is secured to the lower frame or bed of the machine so as to be readily detachable therefrom, preferably from the outside as for example, by the screws 389. The collar 387 or upper portion of the clutch is guided and retained by the shaft 377 and is normally held in place by gravity only.

The carriage return drum 274 is journaled as at 390 to the underneath side of the table 86 which is the top plate of the hood and this drum has teeth 391 engageable with similar cooperating teeth 393 on the collar 387. The drum 274 as previously stated, has fast to its peripheral groove a cord 273 which passes over a pulley 394 journaled to the rail 111 and has its free end attached to the blade 262. The function of the spring 395 is merely to keep the cord 273 taut at all times and the spring is preferably a small hair spring offering no appreciable obstruction to the movement of the carriage.

The operation of the motor carriage return is as follows:— The key 360 is pressed down. The rear end of the motor carriage return key lever 361 compresses the spring 370 while raising the sleeve 381. When the key 360 is pressed half or more of its travel the spring 370 starts to expand and force the sleeve 381 to its upper limit of travel, carrying the collar 387 into contact with the drum. The rotation of the shaft and sleeve is now transmitted to the drum which winds up the cord 273 as far as possible. The shaft 377 however is constantly revolving and since the collar 387 which is not fast to the shaft 377 in any way can no longer revolve with the shaft 377 since the cord 273 is now taut, the steep angular faces between the head and collar cam down the sleeve which is held up only by the spring 370, and which is purposely relatively weak. This action lowers the head 386 and the height of the teeth in the clutch is sufficient to carry the spring 370 past the so-called dead line position considering it as a toggle and the spring 370 therefore snaps the lever 361 back to normal position. The collar 387 which now has nothing to keep it aloft falls by gravity with the sleeve 381 into the position shown in Figures 49 and 50.

The drawing up or winding of the cord 273 on the drum 274 accomplishes two substantially simultaneous motions as in an ordinary typewriter, one the return of the carriage and the other the line spacing operation. In an ordinary typewriter however these two operations, while substantially simultaneous, may one take place before the other and in any event the line spacing is positively moved, whereas in the present machine the line space is merely set and the spring 141 performs the actual line spacing of the paper holder only after the cord 273 is released. The return of the carriage is had since the pulley 394 is fast to the carriage rail 111 and the line spacing setting is had since the blade 262 is pulled to the left with respect to the rail as viewed by the operator.

Considering now Figure 18, the winding of the drum 274 moves the rail 111 to the right as viewed from the operator. The blade 262 is moved generally in the same direction since it is secured to the carriage rail frame by the bracket pins 271 but in view of the connections, as best seen in Figure 51, the blade is given a reverse movement with respect to the rail during the motor carriage return operation. This causes the blade rack teeth 268 to turn the gear 121 and consequently the rod 118 in a clockwise direction as seen in Figures 15 and 18 which engages the sleeve 126 without lost motion since the lug 127 on the sleeve is in engagement at this time with the side of the wide groove 128 in the rod 118 and this causes the link 131 to move to the right just as if the operator had pulled the lever 125 toward the post 170 to set the line spacing mechanism which thereafter operates in the way previously described.

*Continuous form manifolding frame.*—In using devices of this character it frequently happens that a great number of statements or other small papers are to be prepared in which exactly the same sequence of writing and of calculating is had with each. In such cases the papers—we will call them bills in the following description for the sake of clearness—are printed in lengthy or continuous forms which may be rolls but preferably are made in fan fold shape, this being the preferred form in the art at the present time. I contemplate the use of a number of manifolding frames, a perspective of one of which is shown in Figure 60. In this case I have shown a top or original sheet 410 with two copy sheets 411 altho naturally as many of the copy sheets may be used as desired.

The manifolding frame numbered generally 412 consists of an open rectangular box having a back wall 414, a right side wall 415, a left side wall 416 but having no vertical front wall, the front consisting of a slight arced lip 418 to guide the front portion of the sheet 410, that is, the bottom of the bill form being written upon, upward to a convenient position to be withdrawn by the operator. The rear wall 414 has a slot 419 thru which the top sheet 410 and the copy sheets 411 are fed and these forms are clamped at the front edge of the frame by a member 420 which I will call a bail since this member is pivoted as at 421 in the two side walls of the frame and is held in engagement with the lip 418 by the springs 422 so as to firmly grip the forms against the lip.

Two rods 424 and 425 are journaled in the frame on the outside of each side wall and parallel therewith and to each rod is fastened the end of a number of sheets of carbon paper, equal to the number of copies 411. The length of these sheets will depend upon the number of carbon copies it is desired to make but in any event will be many times the length of the width of the form. The side walls 415 or 416 have their lower edges somewhat above the lower level of the rear wall 414 and the bottom edges of these two side walls guide the carbon paper and maintain it or them in flat condition just above the bottom copy sheet 411.

The feeding of the carbon paper is performed manually. The rod 425 has at its rear end a roughened or knurled wheel 426 by turning which the sheets of carbon paper 427 will be wound upon the rod 425. A pawl 428 is held by a leaf spring 429 in contact with the knurled wheel 426 and holds the carbon paper taut, there being a similar mechanism for the other rod 424. It is necessary to shift the carbon paper only very slightly and at intervals, say about once to each six or eight forms. Since the two springs 429 are operating in opposite directions it will be necessary for the operator to raise one spring (as by pressing the free end of the pawl) while moving the opposite knob.

While the operator could readily raise the bail 420 to free the form sheets I prefer to add a small slide 430 for this purpose having a handle 431 in position for convenient manipulation by the operator. The slide is secured to the side 416 by means of a plurality or screws 431 which are received in slots 432 of the slide. The forward end of the slide is provided with rack teeth 433 meshing with a gear 434 on the near pivot 421 of the bail. Pulling the handle 431 forward rotates the gear 434 and raises the bail 420 carrying the pins 436 on collars 437 fast to the pivots 421 past a vertical plane thru the axis of the pivots 421 whereupon the springs 422 hold the bail elevated. the collar 437 having been moved approximately 180°.

When the operator has drawn the form sheets toward her a proper distance she pushes the handle 431 backward which clamps the paper again whereupon the operator tears off the written forms, the bail now acting as a cutting edge. The front shelf or lip 418 is cut away centrally as at 440 to make it more convenient for the operator to grasp the sheets of the form. The various manifolding frames 412 are preferably hung at the rear of the machine on a rack or other support not shown and are brought forward as needed, there being one frame for each type or style of form.

To prepare the machine to receive the manifolding frame the ribbon housing 81 is preferably moved to one side out of the way altho this is not necessary as the up and down clearance is sufficient to permit the following operations. The separate section 104 of the paper receiving basket, is hinged to the main section 103 this hinged connection as best seen in Figure 7, consisting of a hinge rod 450 secured to a number of short tongues 451 preferably integral with the section 104. These short tongues 451 project thru slots 452 in the section 103 and I secure the rod 450 to the tongues after the parts are assembled.

On the section 104 are the plurality of latches 453 which normally hold the parts in the position shown in Figure 8. By pulling the section 104 forward (the front section 105 usually being in the dotted line position in this figure), I release the engagement between the main basket section 103 and the latches 453 at which time the entire assembly carried by the sections 104 and 105 may be dropped beneath the plane of the table. This provides clearance for the manifolding frame 412 to move back as far as the collar 84 thus providing increased range of writing on the form.

Referring now particularly to Figures 10, 13 and 15 the lower paper shelf 151 has a plurality of studs 162 and those studs are so positioned as to receive the holes 456 in a projecting ledge 457 of the manifolding frame.

The advantages of these manifolding frames may possibly be best understood from a concrete example. We will assume that the device is in use in a factory. A traveling salesman has sent in an order which has been filled in whole or in part. The order is then brought to the invoicing clerk here mentioned as the operator. The operator reaches behind her machine and from its proper place in the rack draws forward the invoice manifolding frame which contains possibly as many as a half a dozen carbon sheets and at this time has threaded thru it the form sheets which are usually in fan fold and in fairly long continuous strips containing a great number of invoice blanks, each of the same length.

The operator lifts the ribbon housing 81, throws it entirely to the right, pulls rearward the section 104 of the basket and drops this section, with the extension 105 folded back upon it, down into the main section 103 of the paper receiving basket which clears the entire top of the table back as far as the platen bracket support. The paper holder 114 is now drawn as far forward toward the operator and the handle 160 is pushed from the operator as far as it will go. The invoice manifolding frame 412 is now slipped over the studs 162 which are rather snugly received in the holes 456 and the jaws closed by tripping the latch or trigger 163.

The platen is now restored to writing position and the previously used tabulator bar assembly 292 is lifted out of its place and the tabulator assembly set for the invoice operation is substituted. Obviously a single tabulator bar assembly could be used but this would necessitate the shifting of the stops for each style of form used and it is a very simple matter to keep on hand three or four of the assemblies as they can be taken out and replaced with the greatest of ease as they have no positive engagement with the frame except the locating engagement of the pins 304. The tabulator assembly always projects slightly to the right hand side of the machine and when the carriage is a slight distance to the left the assembly can be removed by lifting the right hand end of the unit until the pins 304 clear the side walls at which time the tabulator unit can be slid to the right until it is free of the machine. The new unit or assembly is inserted in the slot and pushed to the left and it will drop in place when it is pushed all the way in and released. The operation just described, while requiring a great many words, can be done in practice in only a few seconds but if it were required to reset the stops in the tabulator assembly the time required would be quite considerable.

The operator now writes in the name and address of the purchaser, and in the proper place on the blank which is entirely visible at all times she typewrites in the unit quantity and the name or description of the goods.

She next presses the tabulator key and the carriage jumps to position to print the unit price which the operator indexes on the "A" group. Upon striking the motor bar the unit price is extended into the multiplying mechanism and at the same time is printed on the face of the invoice by reason of the automatic operation of the extend rack bar of the tabulator assembly. She next multiplies by the original quantity which has already been typewritten on the face of the invoice. This is done by pressing the appropriate keys of the Group "B" series to the right hand side of the machine. By pressing the motor bar again the product is printed on the face of the invoice, the tabulator having been set to perform this operation without need for attention on the part of the operator provided she uses the tabulator key to move the carriage and does not move it by hand. The operator carries the other items of the order to the invoice in the same way, returning the carriage at each line either by hand or preferably by the motor return. At the end of the bill the operator pulls the entire invoice form toward her and tears it off on the dotted line.

When the operator has finished invoicing she will next take up the posting. To accomplish this she releases the invoice manifolding frame, puts it back into the rack and with it replaces the invoice tabulator assembly substituting for the latter the posting tabulator assembly. She does not require a manifolding frame for posting but will probably substitute for the manifolding frame the proper number of carbon sheets which will be perforated by the paper holder and held on its studs. Posting operation has been described and will be omitted here. After posting is complete the operator will probably make out the bills of lading. There is a manifolding frame containing these forms and naturally a tabulator assembly which are used in exactly the same manner as described in connection with the invoicing.

*Non-locking feature.*—The letter types of the typewriter are not as convenient of access in this machine as in the modern straight typewriting machines and it is therefore convenient to render these keys non-locking. No access is necessary at all for cleaning as the types remain clean since they strike neither the carbon paper nor the ribbon but strike only the bottom of the lowest copy sheet and therefore do not fill as in all other machines. Referring particularly to sheet 5, Figures 5, 62 and 63, it will be noted that the type bodies 470 are cylindrical and are of the same diameter as the end 471 of the type bars and it will also be noted that the tapered shank 472 of the type body is quite short invariably being of such length that the distance between the cylindrical portion 470 of the type and the proximate surface of the type bar is too slight to permit the types to lock. By reason of this construction, when the types are jammed by crossing as is quite common in all machines they can readily be disassociated by merely lifting up the higher key of the two held depressed, while pressing down on the key depressed a greater amount.

By making the key body of uniform cross section, not necessarily cylindrical and by slightly tapering the center portion 475 of the hole each individual type is guided to the printing point both longitudinally and laterally so that the writing is necessarily correctly aligned. In Figure 62 the writing opening extends to both right and left of the central conical letter writing opening 475. The left hand side 477 is for printing numerals by means of rack bar carried type while the similar slot 478 to the right is used for printing in the date which is accomplished by a well known and old mechanism not even indicated in the present application as no claim is made for it.

What I claim is:—

1. In a printing adding machine, a housing having a table, adding mechanism within said housing including a series of members carrying printing types, and a platen above said table and having a flat face which is movable sideways of the table and in its own plane and cooperating with said types to print characters on a sheet of paper on said table said platen moving relatively to the paper.

2. In a printing calculating machine, a housing having an apertured table, printing calculating mechanism within the housing including a series of rack bars, types carried by each of said rack bars and means for moving said types through said aperture, and a platen above said table cooperating with said types to print characters on the visible side of a sheet of paper on said table, said platen being laterally movable with respect to the printed characters to thereby render them visible immediately after printing.

3. The device of claim 2 including means acting automatically to shift laterally the position of the platen with respect to the paper after each printing impression whereby the writing is visible immediately after printing.

4. In a calculating machine, calculating mechanism including upwardly movable printing types, means to hold and move a sheet of paper longitudinally and laterally in a horizontal plane above said calculating mechanism so as to be written upon by said type, and a movable platen above said paper movable with respect thereto in a fixed plane parallel to the plane of the paper.

5. The device of claim 4 in which the platen is pivoted about an axis between the operator and the printing point, but is so shaped that the last written line is visible to the operator while the next line is being written.

6. A printing calculating machine having a laterally movable platen, calculating mechanism having printing types, means for driving the types against the platen, and means actuated by said last means for oscillating the platen with respect to the paper to give visibility to the writing at the printing point.

7. In a printing calculating machine, calculating mechanism including a plurality of printing types, a platen having a plane printing surface means movable to cause said types to print, and means actuated by the last mentioned means for feeding a sheet of paper between said platen and said types in a plane parallel to the platen printing surface.

8. The device of claim 7 in which the paper feeding means is movable in the plane of the paper at right angles to the direction of paper feed.

9. In a printing calculating machine, a flat paper supporting surface, a paper holding carriage movable thereon both longitudinally and laterally, calculating mechanism including a plurality of printing types, and means movable with respect to the paper cooperating with said types to print on paper held by said carriage, said carriage maintaining the paper in the plane of said supporting surface and means for connecting said calculating mechanism to said means to cause said means to shift laterally as the printing types are operated.

10. In a combined typewriter and calculating machine, a frame, calculating mechanism and typewriter mechanism carried by said frame, a readily detachable cover for said frame fitting above the entire frame and mechanism, and platen mechanism carried by said cover and cooperating with both the typewriter and calculating mechanisms, said platen mechanism including members detachable from portions of the typewriter and calculating mechanisms and cooperating therewith when the cover is in place on the frame.

11. In a combined typewriter and calculating machine, a frame, calculating mechanism and typewriter mechanism carried by said frame, a readily detachable cover for said frame fitting above the entire frame and mechanism, and paper carrying mechanism carried by said cover and cooperating thru meshing gears with both the typewriter and calculating mechanisms.

12. In a combined typewriter and calculating machine, a frame, calculating mechanism and typewriter mechanism carried by said frame, a readily detachable cover for said mechanism fitting said frame; and a platen assembly, paper carrying means, and ribbon feeding mechanism all carried by said cover cooperating with both the calculating and the typewriter mechanism, thru meshing gears readily separable upon the lifting of the cover from the frame.

13. In a combined typewriter and calculating machine, a frame, calculating mechanism and typewriter mechanism carried by said frame, a readily detachable cover for said mechanism detachably fitting said frame, and the following elements carried by said cover, namely; a platen, a carriage assembly including paper holding means, carriage return mechanism, and ribbon feed mechanism, said platen cooperating with both the calculating and the typewriter mechanism, said paper holding means, carriage return mechanism, and ribbon feed mechanism being detachably geared with and driven by said frame carried mechanism.

14. In a combined typewriter and printing adding machine, a plurality of typewriter bars, adding mechanism types, means for supporting a sheet of paper above the type bars and the adding mechanism types, means for moving a sheet of paper laterally after each actuation of the typewriter bars, and separate means movable into position to advance the paper at right angles to said lateral movement at each printing actuation of the adding mechanism types, said last mentioned means advancing the paper from front to back each time the adding mechanism prints and advancing the paper from right to left upon the printing of each letter by the typewriter bars.

15. In a printing adding machine, adding mechanism, a paper basket, a hinged extension thereof, a member hinged thereto, and means carried in part by said member for advancing paper from said basket in response to actuation of a portion of the adding mechanism.

16. In a printing adding machine, adding mechanism, a paper basket, a bracket having a platen at one end thereof, a pair of rolls, and means carried in part by said bracket and in part by said basket to drive said rolls to feed paper from the basket past said platen in response to actuation of the printing portion of the adding mechanism.

17. The device of claim 16 which includes as an element of the drive means, a spring rack and a ratchet wheel normally out of mesh but adapted to mesh in response to actuation of the printing adding mechanism whereby the paper feed is driven thereby.

18. In a calculating machine, a plurality of rack bars, mechanism for selectively advancing said bars, adding machine gears operated by said rack bars, type carried by said rack bars, and means for striking said types to print the result, the faces of said types when at the printing point lying in a plane above all of said mechanism whereby a flat writing bed may be used to hold the paper above said type to receive the print.

19. In a combined typewriting and printing calculating machine, a plurality of letter types, a plurality of numeral types, a platen normally in the path of the letter types and to one side of the path of the numeral types, and means for selectively operating the types to printing position including means for laterally shifting the platen into the second named path simultaneously with the printing movement of said numeral types whereby the letters or numerals may be printed alternately in either sequence.

20. In a printing calculating machine employing a plurality of result keys and a movable carriage, a tabulator assembly including a tabulator key, and means in said assembly for automatically setting the result keys in desired sequence when the carriage is moved to various positions by the tabulator key, said means being inoperative to set the result keys when the carriage is moved to the same position by the space key.

21. In a printing calculating machine employing a plurality of result keys and a movable carriage, a tabulator assembly including a tabulator key, and means in said assembly for automatically setting the result keys in desired sequence when the carriage is moved to various positions by the tabulator key, said means being inoperative to set the result mechanism when the carriage is moved to the same position by the carriage release.

22. In a printing calculating machine employing a plurality of result keys and a movable carriage, a tabulator assembly including a tabulator key, and means in said assembly for automatically setting the result keys in desired sequence when the carriage is moved to various positions by the tabulator key, and means operable while the carriage is in any one of such positions to restore the set result mechanism while holding said first means inoperative.

23. In a printing calculating machine employing a plurality of result mechanisms and a carriage, a tabulator assembly including a tabulator key, means in said assembly for automatically setting a definite one of said mechanisms when the carriage is moved to a definite scale setting by the tabulator key, and means for releasing said set mechanism independent of said first means, and for setting a different result mechanism while the carriage remains at that scale setting.

24. In a printing calculating machine employing a plurality of result mechanisms and a carriage, a tabulator assembly including a tabulator key, means in said assembly for automatically setting a definite one of said mechanisms when the carriage is moved to a definite scale setting by the tabulator key, and means for restoring the result mechanism to the state it was before the tabulator key was struck upon actuation of the set result mechanism.

25. In a printing calculating machine employing a plurality of result mechanisms and a carriage, a tabulator assembly including a tabulator key, means in said assembly for automatically setting a definite one of said mechanisms when the carriage is moved to a definite scale setting by the tabulator key, and means for restoring the result mechanism to the state it was before the tabulator key was struck upon actuation of the set result mechanism, and means for setting a different result mechanism, said last means being operable simultaneously with and by said restoring means.

26. In a calculating machine having tabulator and state control mechanisms, a readily replaceable tabulator stop unit, and means thereon for manually determining the setting of the tabulator and state control mechanisms.

27. The device of claim 26 in which the setting means are adjustable on said unit only when the unit is removed from the machine.

28. In a calculating machine having tabulator and state control mechanisms, a readily removable and replaceable unit, adjustable means thereon for determining the settings of the tabulator mechanism and the writing margin.

29. In a calculating machine having tabulator and state control mechanisms, a readily removable and replaceable unit, and independently removable means thereon for setting the tabulator and state control mechanisms and also controlling the writing margin.

30. In a calculating machine having tabulator and state control mechanisms, a readily removable and replaceable unit, and means thereon for setting the state control mechanism and for governing the writing margin.

31. The device of claim 30 in which the setting means and the margin governing means are adjustably carried on pivoted bars by the replaceable unit.

32. In a printing calculating machine, a housing having an apertured flat top and mechanism for holding paper in a horizontal plane thereabove, extending mechanism, totalling mechanism within said housing, means operated by the totalizing mechanism whereby the calculated total may be presented by a portion of the printing types of the mechanism, a platen above the table and in engagement with the paper when the latter is printed upon, and means for projecting the said portion of the printing types against the under side of the paper and toward the platen whereby to print visibly the calculated total upon the upper side of the paper.

33. In a calculating machine of the type in which the answer may be printed, a housing, calculating mechanism within the housing including a series of rack bars the position of which is altered by movement of the calculatng mechanism, types carried by each of the rack bars, a platen the striking point of which is located above but normally to one side of the types carried by the rack bars a ribbon between the platen and paper, means for hammering the types upwardly against the paper so that the numerals will be printed upon the top surface of the paper, and means operatively connecting said hammering means with the platen to move the platen to normal position after printing, to render visible the printed answer.

34. In a calculating machine, calculating mechanism including a series of finger operated keys, each carrying a numeral, printing mechanism carried by the calculating mechanism and moved thereby to printing position upon operation of the suitable key, means to hold a sheet of paper in a plane located above the calculating mechanism and so as to be printed upon by said calculating mechanism, and a platen located between the operator and the calculating mechanism, means for driving the printing mechanism against the bottom surface of the paper to print upon the top surface of the paper by engagement with the platen, and means for moving the platen after each printing to render visible the result printed upon the paper.

35. The device of claim 34 in which the calculating mechanism includes a series of rack bars movable in a horizontal direction, types carried by each rack bar, and means exposing to the operator's view all the printing except the word or number being printed.

36. In a calculating machine of the type having calculating mechanism including multiplying mechanism and adding mechanism, printing types controlled by the action of the calculating mechanism, an oscillating platen against which the types strike, and means normally shifting the platen about a vertical axis so as to give visibility to the writing at the printing point immediately after each impression, said means being controlled by that portion of the mechanism which operates the printing types.

37. In a calculating machine of the type which prints results upon a sheet of paper, means for holding a sheet of paper on said machine calculating mechanism including a plurality of rack bars each carrying printing types, mechanism for striking the printing types to write upon the exposed side of a sheet of paper held on the machine, a platen supported adjacent said exposed side and having a plane printing surface, means for feeding a sheet of paper between the platen and the types in a plane parallel to the platen printing surface, means operatively connected to the printing types to move the platen to printing position for impression, and further means for restoring the platen to normal position after each impression to render visible the printed result.

38. The device of claim 37 in which the paper is held in a horizontal plane and the paper feed mechanism moves laterally in such horizontal plane but feeds the paper away from the operator on actuation of the calculating mechanism printing elements.

39. In a combined typewriter and calculating machine, a generally rectangular frame, calculating mechanism and typewriter mechanism carried by said frame, said calculating mechanism including means for multiplying and means for totalling, means whereby the totals may be printed upon a sheet of paper, a readily detachable cover for the frame, and means carried by the cover for moving a sheet of paper held flat across the cover so as to be printed upon by the calculating mechanism and also by the typewriter mechanism, said means including escapement mechanism mounted on the cover and operated by a portion of the typewriter mechanism carried by the frame.

40. In a combined typewriter and printing adding machine, number printing mechanism for printing a column of figures and for printing their total, means for typewriting words, means for holding a sheet of paper so as to receive the words and also the individual numbers and the totals, means for moving the paper holding means laterally in response to each actuation of the typewriter bars, and other means for moving the paper away from the operator in response to each actuation of the number printing mechanism.

41. In a calculating mechanism having tabulator mechanism, state control mechanism and also having typewriting mechanism, an assembly freely detachable as a unit from the machine and means adjustably mounted on the assembly for setting the state control mechanism to agree with a printed form and for governing the writing margin to agree with that form, whereby when the operator changes from one form to another she can replace the assembly for the finished form with an assembly for the new form and thus obviate the setting of the tabulator and state control mechanisms by hand upon changing from one form to another.

42. In a combined typewriting and printing computing machine, a series of typewriter levers each carrying a positive letter type, a bank of typewriter keys to operate the levers to typewrite words, adding and computing mechanism including a series of rack bars each carrying positive numeral types movable toward and away from the operator, a bank of numeral keys for setting quantities to be added or multiplied, extending and totalling mechanism, a platen located above the rack bars and above the typewriting mechanism, said platen being of a size slightly greater than the width of all the rack bars and movable to the common writing point of all of the typewriter levers, and means for feeding a sheet of paper between the platen and the numeral and letter types in response to printing actuation of either.

43. A replaceable unit for a calculating machine including a case, a plurality of rack bars hinged to the case, and stops adjustable on the rack bars.

44. A replaceable unit for a calculating machine including a case, a plurality of rack bars movable with respect to the case, stop members adjustably carried by the rack bar and means for releasably holding the rack bars in position on the rack case.

45. In a replaceable unit for a calculating machine having tabulator and state control mechanisms, a casing having a plurality of partitions, a rack bar pivoted in the space defined by the edge of the case and the adjacent partition, a master rack bar in the space between two central partitions, said rack bar being slidable longitudinally of the case, adjustable stops on each of the rack bars, and means carried by the master rack bar for moving said master rack bar with respect to the case.

46. In a calculating machine, a frame, calculating mechanism, a key for operating a portion of the calculating mechanism, a carriage, tabulator mechanism including a tabulator shaft, a tabulator lever fast to said shaft, a tabulator assembly unit, levers on the tabulator shaft for raising the tabulator unit, a rack bar slidable with respect to the tabulator assembly unit, a stop on said rack bar, a slidable member in the path of the rack bar, means on the tabulator shaft for causing movement of the auxiliary rack bar to operate said portion of the calculating mechanism, and spring means normally holding the last mentioned means in position to move free of the calculating mechanism.

47. In a calculating machine, a frame, a carriage, a tabulator assembly, adjustable stops on said tabulator assembly, means for moving the tabulator assembly into position to engage the carriage and to stop the carriage at a chosen point, a plurality of result mechanisms, key means for selectively operating any one of said result mechanisms, a tabulator key, and means controlled by the tabulator key connecting the stop mechanism to operate a chosen result mechanism upon movement of the tabulator key.

48. The device of claim 47 in which the connecting means lies out of the path of the carriage and is brought into operative position only upon movement of the tabulator assembly by means of the tabulator key.

49. A tabulator assembly for a calculating machine consisting of a case, a plurality of rack bars slidably mounted in the case, a stop on each rack bar, yielding means holding the rack bars in normal position, yielding means for releasing the rack bars from the case for adjustment of the stop carried thereby.

50. A tabulator assembly for a calculating machine including a case, lugs on the case whereby the case can be raised and lowered with respect to the frame of the calculating machine, means for preventing lateral movement of the case, a plurality of rack bars carried by the case, pivotally secured thereto and having sliding motion with respect to the case, a spring pressed latch resiliently holding the rack bars against movement about their respective pivots, means yieldingly holding the rack bars in chosen relation to the case, stops adjustably mounted on each of the rack bars, and means on one only of the rack bars adapted to cooperate with mechanism to restore the case to normal position when raised by means of the lug and after operation of the stops.

51. In a calculating machine, calculating mechanism including extending mechanism and totalizing mechanism, a replaceable encased unit held against lateral movement, a plurality of stops laterally movable with respect to the unit case, a key for operating the extending mechanism, a key for operating the totalizing mechanism, a tabulator shaft, and means mounted on the tabulator shaft lying in the path of lateral movement of the auxiliary rack bars and movable by such rack bars to connect the extending or totalizing mechanism upon operation of the tabulator shaft.

52. In a printing calculating and typewriting machine, means attached to the calculating mechanism for alining the number types of the calculation machine at a printing point, means for directing the letter types of the typewriting machine to a second printing point, a platen normally adjacent the second printing point and means simultaneously with the printing movement of the alined number types for shifting said platen into cooperative relation with the number types at said first printing point, said platen being movable with respect to the paper during the normal typing and printing operations.

53. In a printing adding machine, adding mechanism, a housing for said mechanism having an apertured table adjacent said mechanism, said mechanism including a series of type carriers, means for selectively causing certain of said types to register with said aperture, means for raising said types through said aperture, a shiftable platen above said table and normally out of registry with said aperture, and means for momentarily shifting the platen into registery with said aperture simultaneously with movement of said type raising means whereby paper on said table receives a printed impression of the selected number, which impression is immediately visible on release of the type raising means.

54. In a printing adding machine, adding mechanism having a series of members carrying printing type, a housing for said mechanism having an aperture therein adjacent said members, means for selectively causing a desired number of said type to register with said aperture, a platen adjacent said aperture and means tending to hold it out of registry with said aperture, means for simultaneously momentarily bringing the platen into registry with the aperture and bringing the selected types and platen together whereby any desired number may be printed on a paper held between platen and types and the printing made visible immediately thereafter without movement of the paper.

55. In a printing adding machine, adding mechanism having a series of members carrying printing type, a housing for said mechanism having an aperture therein adjacent said members, means for causing a desired number of said type to register with said aperture, means for holding a sheet of paper over said aperture, a platen mounted to oscillate about a vertical axis exterior of said housing and means tending to hold it out of registry with the aperture, means for momentarily bringing said platen into registry with said aperture and for at the same time causing the engagement of the said registered type and platen whereby the impression made on the paper by said engagement is visible immediately thereafter.

56. In a printing adding machine, adding mechanism having a series of members carrying printing type, means for alining a number of said type, means for holding a sheet of paper adjacent said alined numbers but out of engagement therewith, a platen adjacent said alined numbers, an ink ribbon carried by said platen, means tending to hold said platen out of the operator's line of vision between the eye and the paper immediately adjacent the alined type, means for momentarily bringing said platen into said line of vision and for at the same time bringing the platen and numbers together whereby the resulting impression is visible immediately after printing.

57. In an accounting machine having paper holding means and means for printing each number on said paper as desired including a platen, types and type hammer means actuated in response to release of the type hammer for moving the platen with respect to the paper away from the printing point after each impression whereby the printed number is made visible immediately after printing.

58. In a calculating machine having printing mechanism for recording the numbers as desired, means for holding a sheet of paper for printing thereon, a shiftable platen for resisting movement of the paper as it receives the impression, and means for automatically moving said platen with respect to the paper immediately after each impression to render the impression visible as soon as made.

In testimony whereof I affix my signature.

DAVID Y. READ.